Figure 1:
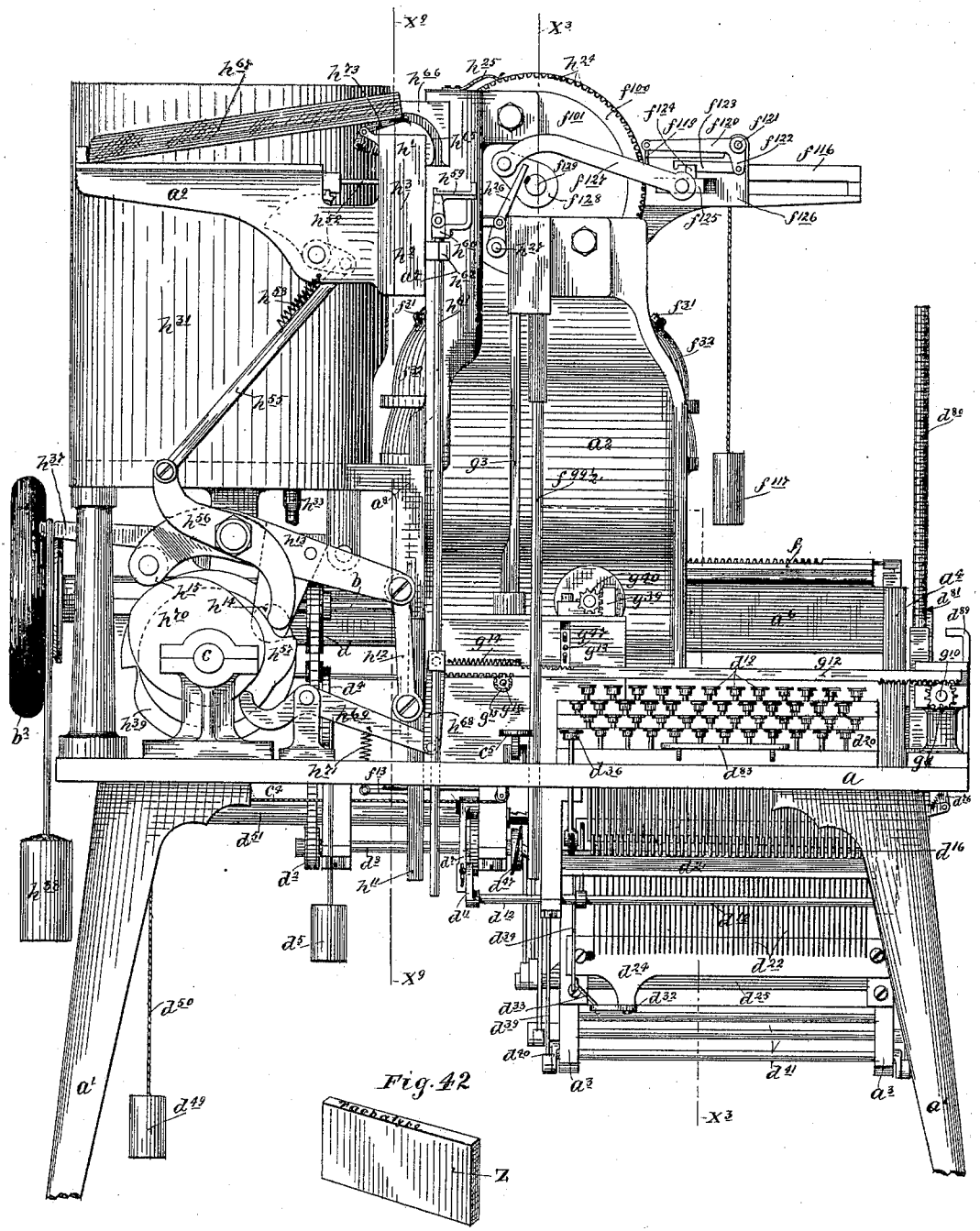

(No Model.)

F. A. JOHNSON.
LINOTYPE MACHINE.

No. 584,363. Patented June 15, 1897.

15 Sheets—Sheet 1.

Witnesses,
A. H. Opsahl
Frank D. Merchant

Inventor.
Frank Amos Johnson
By his Attorney,
Jas. P. Williamson (No Model.)

15 Sheets—Sheet 3.

F. A. JOHNSON.
LINOTYPE MACHINE.

No. 584,363.  Patented June 15, 1897.

Witnesses
A. H. Opsahl
Frank D. Merchant

Inventor
Frank Amos Johnson
By his Attorney
Jas. F. Williamson (No Model.) 15 Sheets—Sheet 4.
F. A. JOHNSON.
LINOTYPE MACHINE.
No. 584,363. Patented June 15, 1897.
Fig. 21.
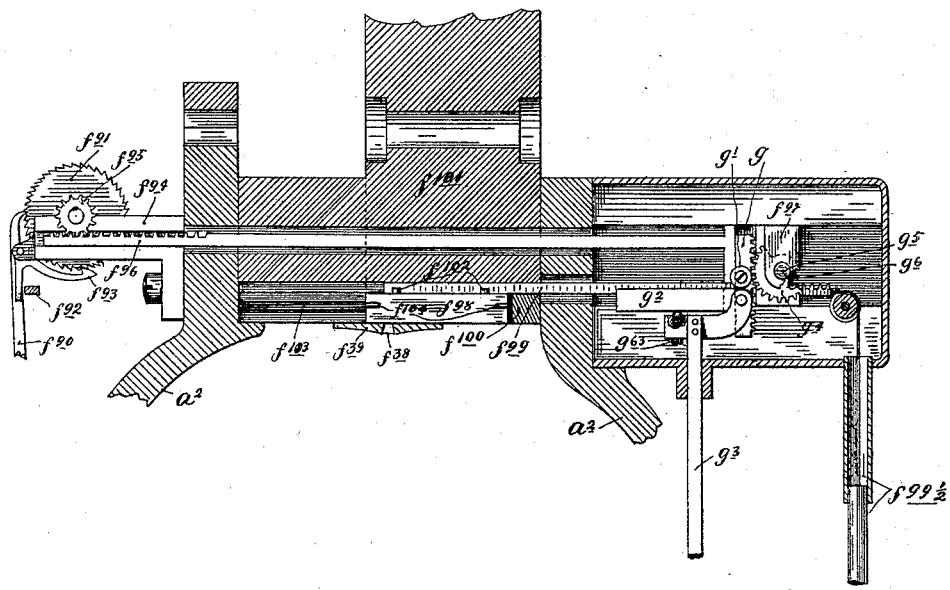
Fig. 4.
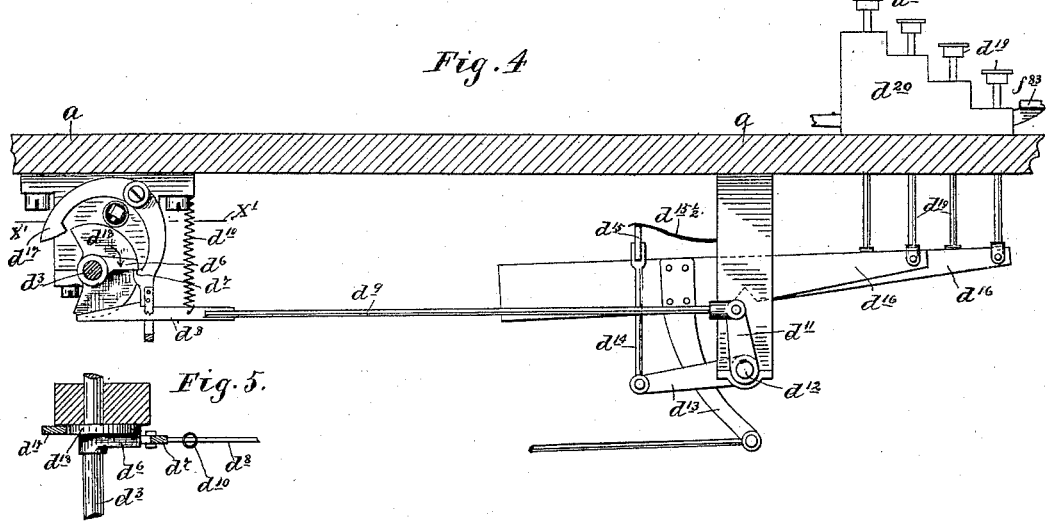
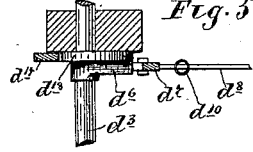
Fig. 5.
Witnesses.
A. H. Opsahl
Frank D. Merchant
Inventor.
Frank Amos Johnson
By his Attorney.
Jas. F. Williamson (No Model.)   15 Sheets—Sheet 5.

F. A. JOHNSON.
LINOTYPE MACHINE.

No. 584,363. Patented June 15, 1897.

Witnesses.
A. H. Opsahl.
Frank D. Merchant.

Inventor
Frank Amos Johnson
By his Attorney
Jas. F. Williamson

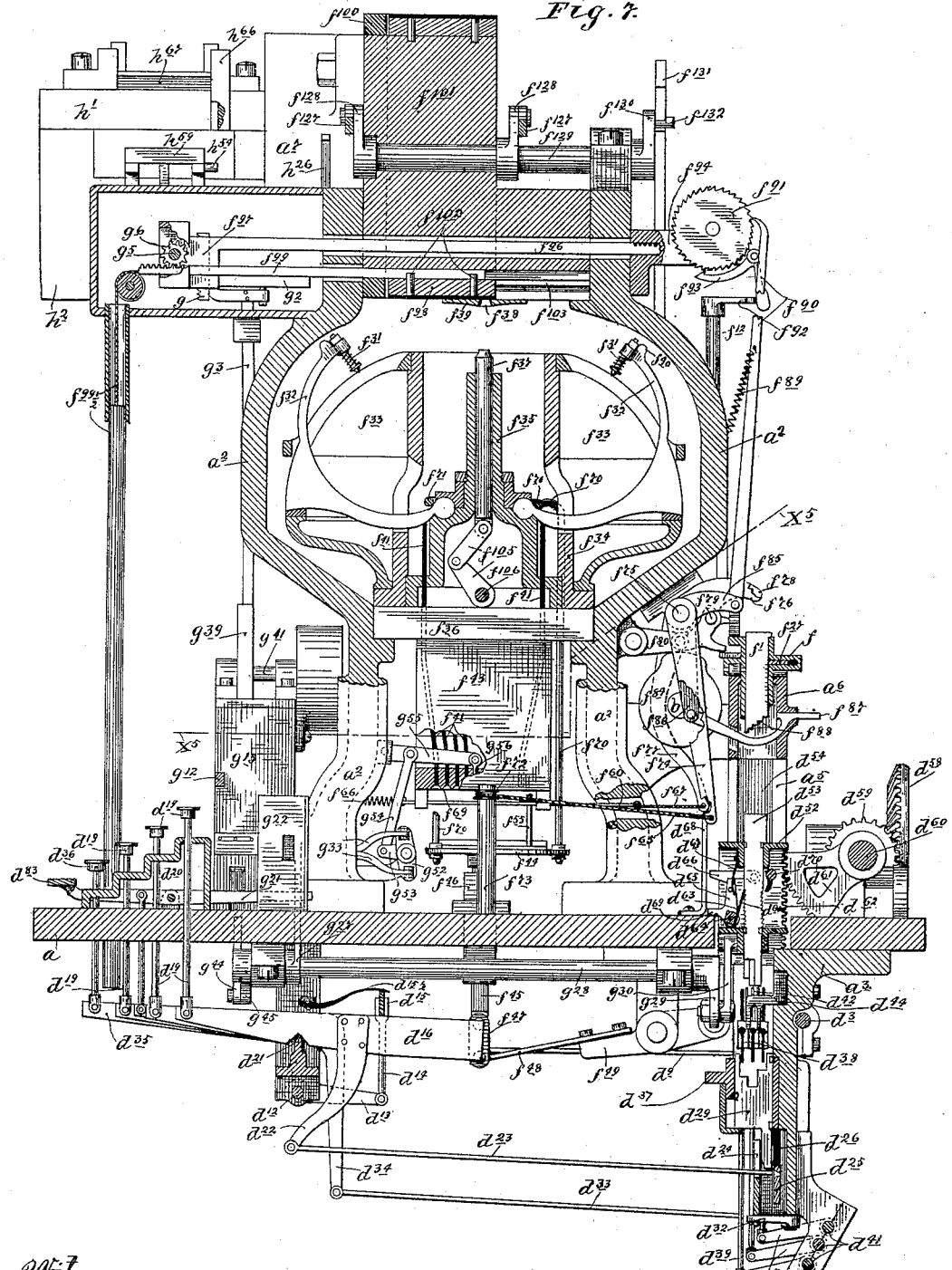

(No Model.)　　　　　　F. A. JOHNSON.　　　15 Sheets—Sheet 7.
LINOTYPE MACHINE.
No. 584,363.　　　　　　　　　　Patented June 15, 1897.
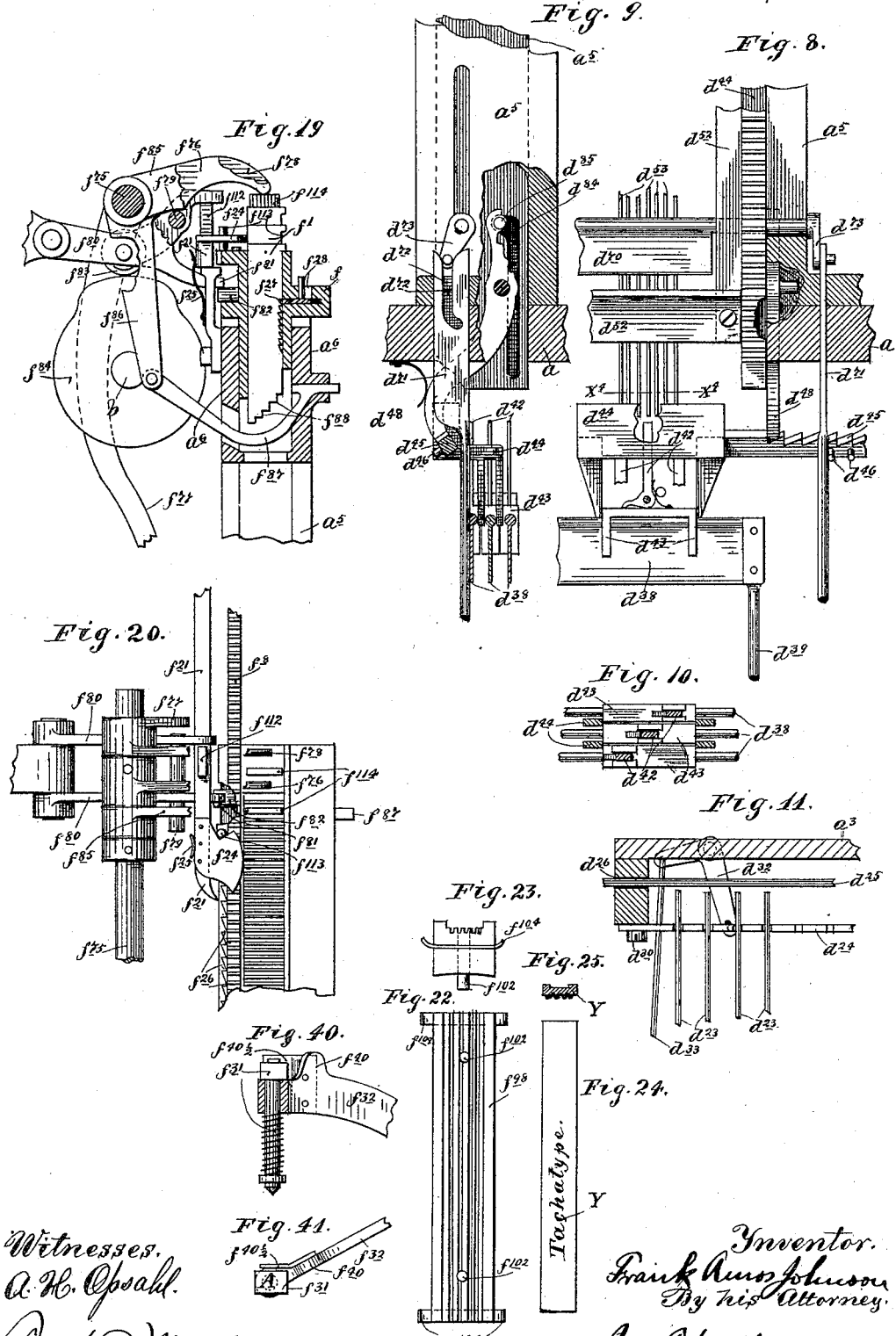

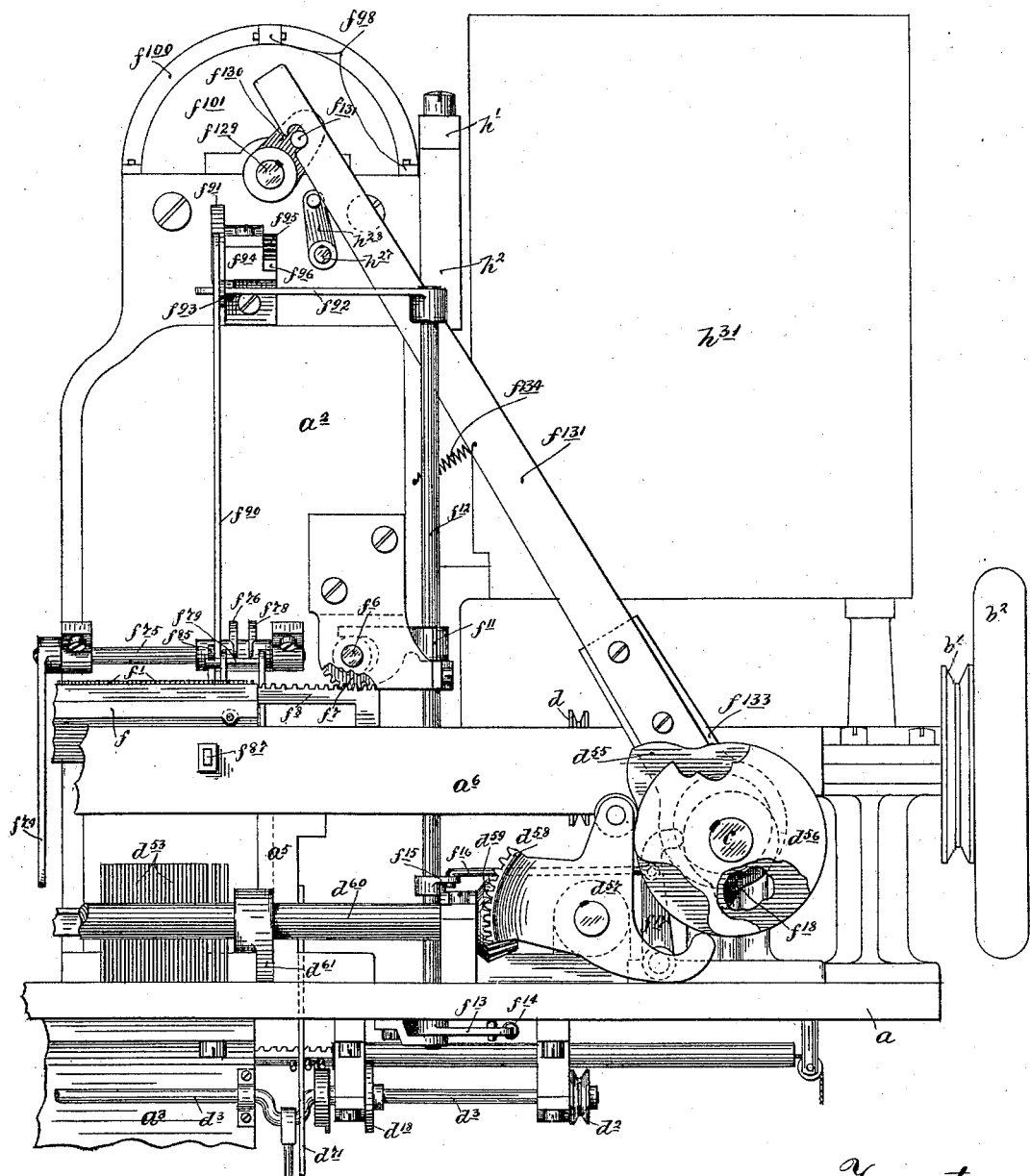

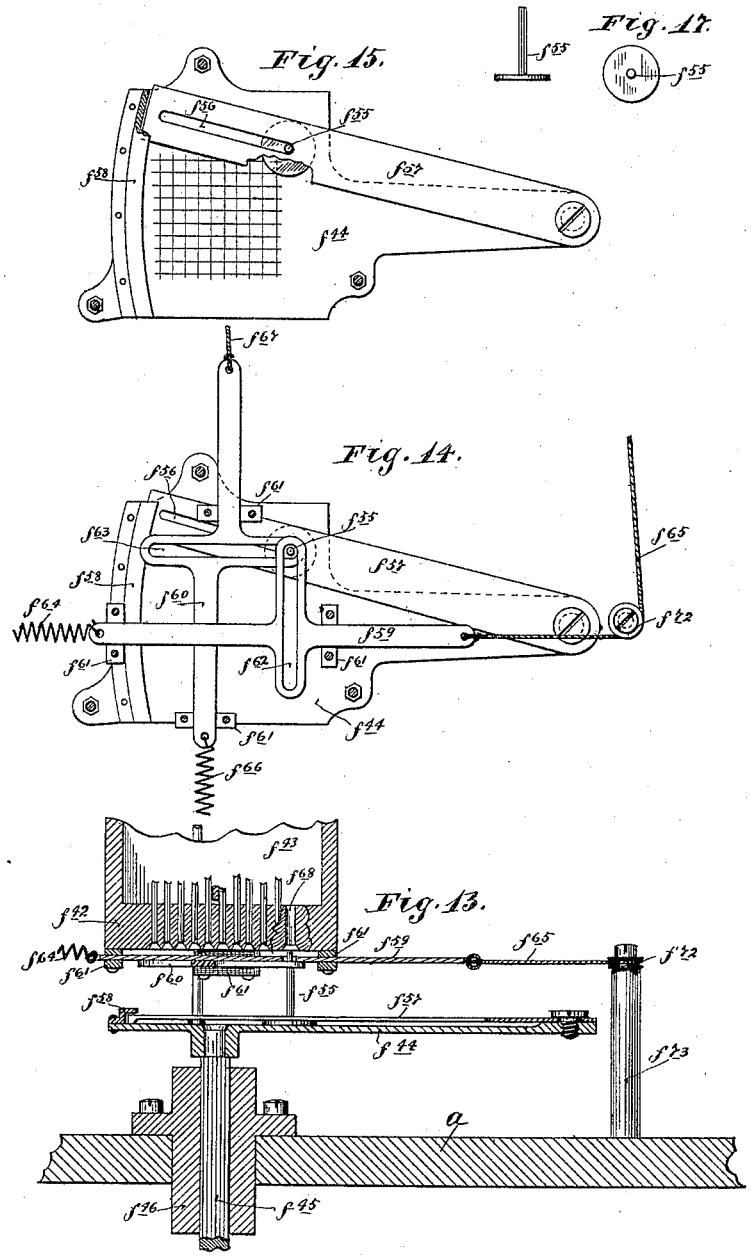

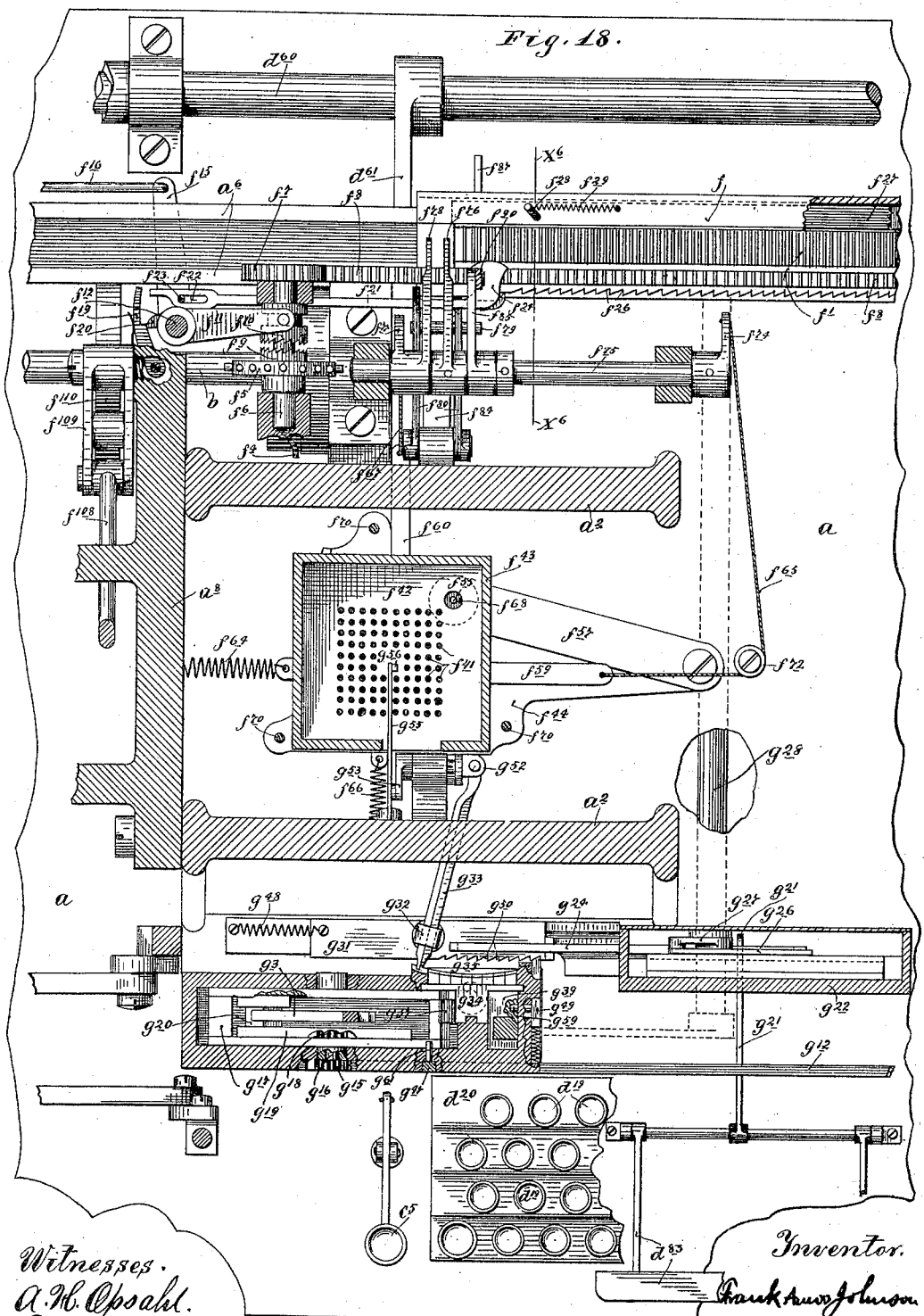

(No Model.)　　　　　F. A. JOHNSON.　　15 Sheets—Sheet 11.
LINOTYPE MACHINE.
No. 584,363.　　　　　Patented June 15, 1897.
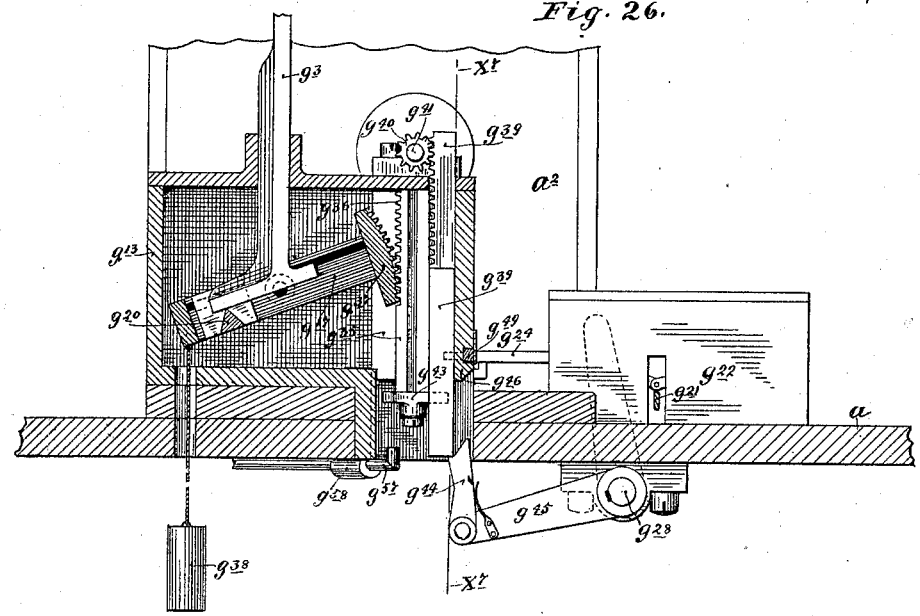
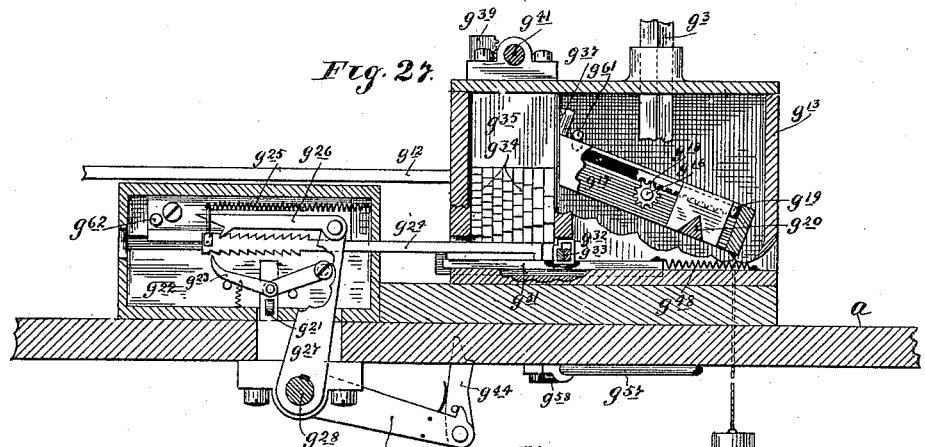
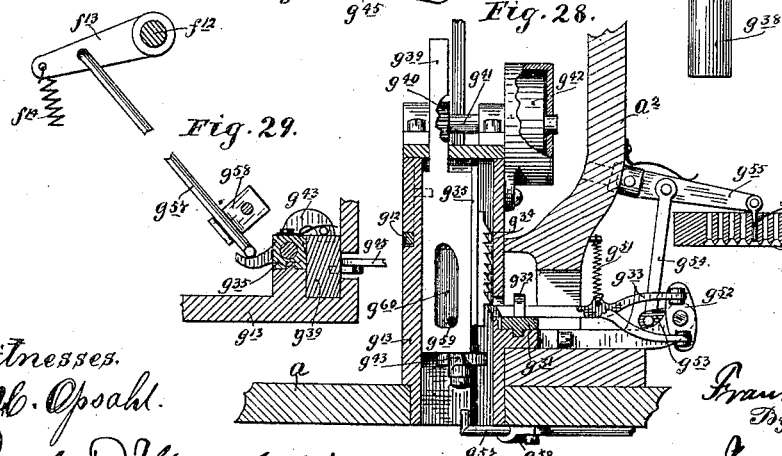
Witnesses.
A. H. Opsahl.
Frank D. Merchant.
Inventor.
Frank Ames Johnson
By his Attorney
Jas. F. Williamson

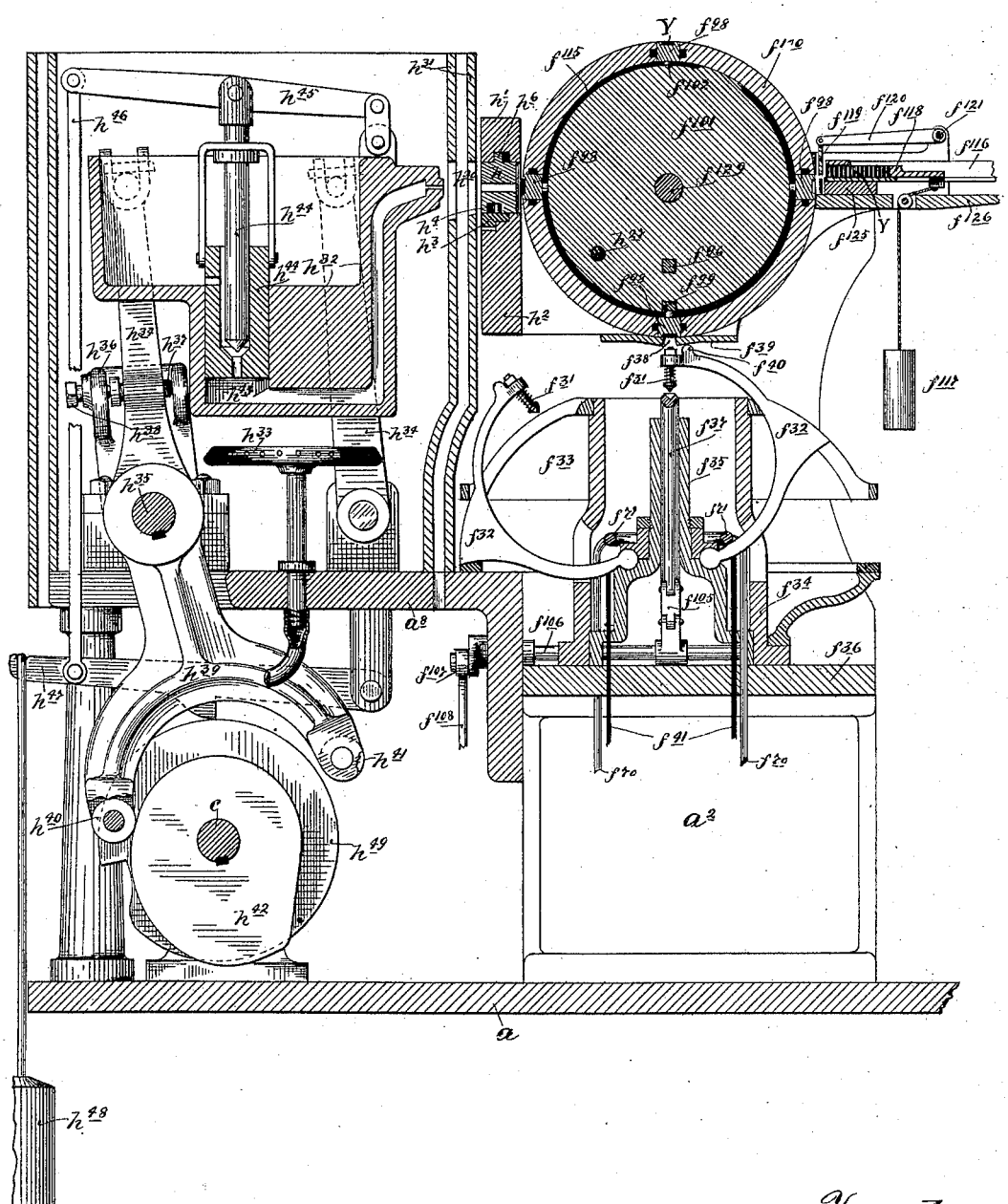

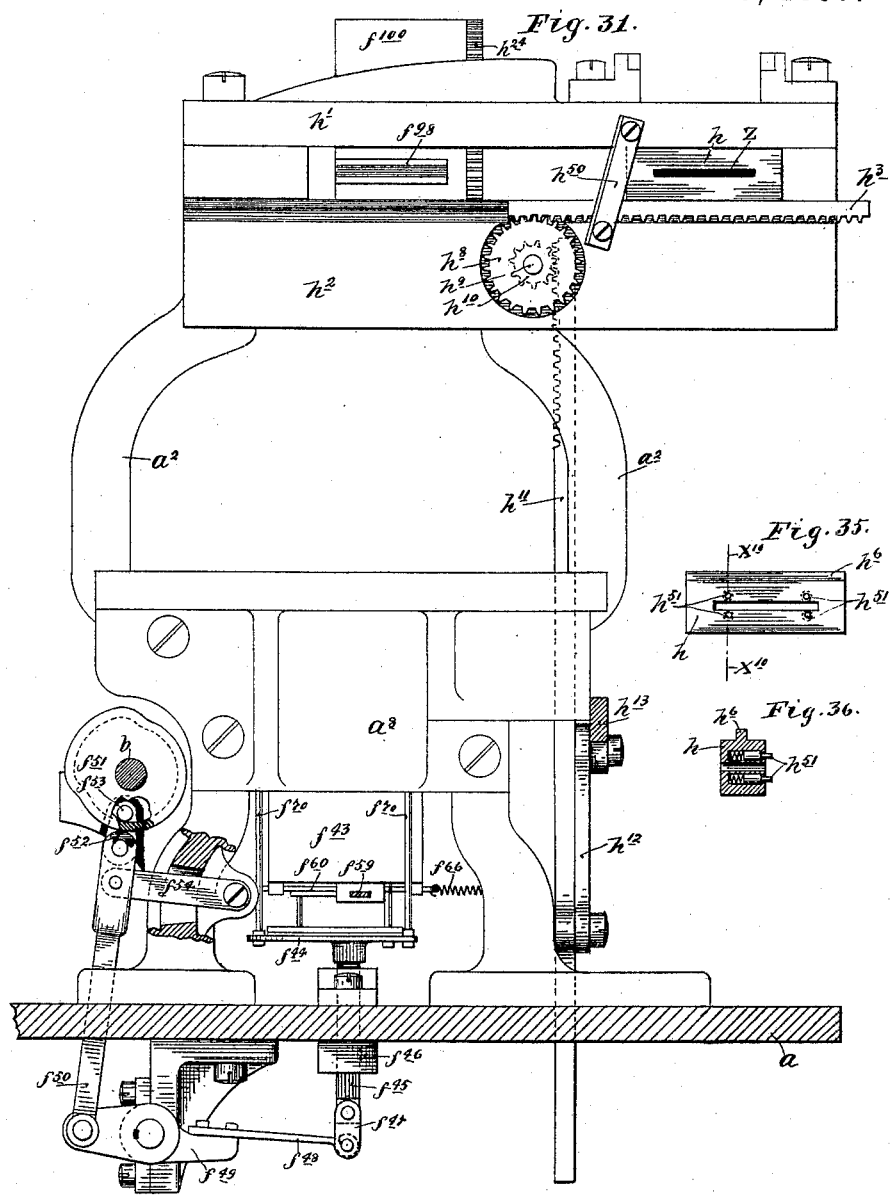

(No Model.)　　　　　F. A. JOHNSON.　　15 Sheets—Sheet 14.
LINOTYPE MACHINE.
No. 584,363.　　　　　　Patented June 15, 1897.
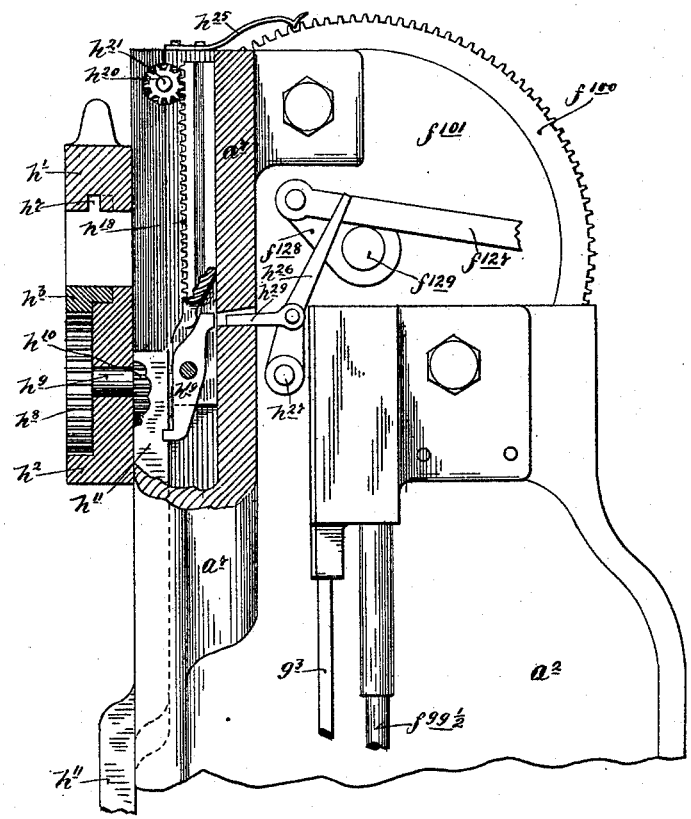
Witnesses.
A. H. Opsahl.
Frank D. Merchant.
Inventor.
Frank Amos Johnson
By his Attorney.
Jas. F. Williamson (No Model.)  
F. A. JOHNSON.  
LINOTYPE MACHINE.

No. 584,363.  
Patented June 15, 1897.

15 Sheets—Sheet 15.

Witnesses.  
A. H. Opsahl.  
E. Felice Elmore.

Inventor.  
Frank Amos Johnson,  
By his Attorney.  
Jas. F. Williamson

UNITED STATES PATENT OFFICE.

FRANK AMOS JOHNSON, OF MINNEAPOLIS, MINNESOTA, ASSIGNOR TO THE TACHYTYPE MANUFACTURING COMPANY, OF SAME PLACE.

LINOTYPE-MACHINE.

SPECIFICATION forming part of Letters Patent No. 584,363, dated June 15, 1897.

Application filed April 25, 1892. Renewed May 17, 1897. Serial No. 637,001. (No model.)

*To all whom it may concern:*

Be it known that I, FRANK AMOS JOHNSON, a citizen of the United States, and a resident of the city of Minneapolis, in the county of Hennepin, State of Minnesota, have invented certain new and useful Improvements in Linotype-Machines, of which the following is a specification, reference being had to the accompanying drawings.

My inventions relate to linotype-machines, and have for their object to provide a machine of increased efficiency for this purpose.

The product of my machine is a justified linotype which is cast from a justified-line matrix.

The inventions involved are in the same line as the inventions set forth, described, and claimed in my former United States patent, issued to me of date November 17, 1891, under No. 463,388, entitled "Matrix-making and stereotyping machine." Many of the foundation principles of construction as described and broadly claimed in the said former patent are employed in the machine herein shown and described. The principle of preliminary representation by means of a dummy or mechanical line, the parts of which are prearrangeable for the entire desired line, to determine the selection of the dies and the spacing of the same, and the use of a double or duplicate set of dummies, so as to insure a continuous operation at the keyboard, is practically the same in both machines. Instead, however, of calling the particular dummy, the parts of which are set directly from the keyboard, "setting-slides" and the frame supporting the same the "slide-frame," the corresponding feature of this machine is called the "duplicate dummy," while the word "dummy" or "dummy proper" will be applied, as in the said former patent, to designate the particular dummy which travels and directly controls the selection of the dies and the spacing of the same.

The casting mechanism and the matrix-holder, with the exception of certain improvements in details, are substantially the same as in the former patent.

The matrix material employed is a strip of lead covered with a facing of copper, as described and claimed in my United States Letters Patent, numbered 478,333, issued of date July 5, 1892.

The machine herein shown and described, however, involves many radical points of departure over the machine set forth in my former patent. The particular features of novelty will appear in the detailed description and be especially defined in the claims. It may be noted at this point, however, that while the machine herein shown and described is organized for the production of linotypes some of the inventions involved are capable of use in type-setting machines and in type-writers, and certain of the inventions involved are capable of other additional uses throughout the arts wherever it is necessary to make a large number of variable selections of desired things from a large series or multitude of things.

Inasmuch as the machine is somewhat intricate, it will probably conduce to a more ready understanding of the same to briefly outline the principal features of its construction, taken as a whole, before proceeding to the detailed description.

First. The dies for producing the matrix are independent of each other, and are mounted for axial movement on a corresponding series of independently-movable carriers, which are preferably in circular arrangement and are adapted to be thrown to the center of the circle as the common point of impression. The matrix material is immovably held on a movable matrix-material holder, to which suitable feed movements are imparted to properly space the impressions from the dies. When at the impression-point, the dies stand in line with the plunger of a power-driven impression device and under a guiding-aperture of a suitable alinement and resistance plate over the aperture in which the matrix-material holder is fed. The die-stems are convex and the head of the impression-plunger is concave. The guiding-aperture in the resistance-plate is bell-mouthed and conforms in shape to the head of the die. With this construction the dies are approximately alined at the impression-point by the carriers, and are finally centered by the thrust of the plunger and the said guiding-aperture in the resistance-plate, so as to secure an accurate and exact alinement of the impressions in the matrix material. By mounting the font of dies in this way, so that the individual dies are independently movable for alinement at the impression-point, the parts may be made light and quick movements secured, similar in action to that of a type-writer.

Second. For operating the die-carriers to aline the dies a series of operating-rods or connections corresponding in number to the number of the die-carriers are provided and are so arranged that their terminals at one end are factored or arranged in groups, so as to permit the selection of any desired die by locating the selecting device in the group and in line with the desired terminal or operating-rod of the group. In the machine as shown the terminals of said rod form rows in two directions, and the selecting device is located for action on the proper terminal, as the resultant of two forces acting thereon from two different directions.

Third. For action on these terminals a selecting device in the form of a finger is provided, which is so constructed and mounted as to be capable of location for action on the terminal of any of the said die-operating rods.

Fourth. This selecting-finger is located or positioned by a suitable placing mechanism, which constantly tends to throw the said finger to an extreme position, but is variably intercepted to locate the finger, as required, for action on the proper rod.

Fifth. The placing mechanism is controlled by the so-called "dummy" or "mechanical line" before noted. This dummy has a series of independently-movable pieces mounted on a common frame, sufficient in number for a line of a maximum length, which are prearrangeable in sets for the selection and spacing of the desired dies. As shown, the pieces or members of each of said sets are three in number, two of which members serve to control the selection of the die and may be called the "selecting" factors, and the third of which members serves to effect the spacing of the same and may be called the "spacing" member. In other words, the two die-selecting members correspond to the bifactored arrangement of the die-operating rods and through the correspondingly-factored placing mechanism above noted serve to variably intercept or limit the movement of the same, so as to properly locate the selecting-finger. The third or spacing member of each set is used as a matter of convenience in this machine to control the feed of the matrix-material holder, so as to properly space the impressions of the dies and effect the normal spacing between words of the line. Of the two die-selecting factors, one is capable of being set on the dummy-frame in as many different positions as there are rows (or groups) of die-operating-rod terminals, and the other is capable of being set in as many different positions as there are rods (or places for rods) in each row or group. Hence any set of selecting factors may be positioned on their supporting-frame so as to control the selection of any die. The spacing member of each of said sets takes as many different positions as there are diversities of feed movements. The dies vary in face from two to seven units. Hence there are six different lengths of feed movement, and the said spacing member takes six corresponding positions, according to the spacing required for the selected die or for the normal spacing of two units between words. It is obvious that any set of the dummy stops or pieces may be used for the selection of any die, depending upon the positions in which the members of the set may be placed.

Sixth. The parts or stops of the dummy proper are set in respect to each other on their supporting-frame by transfer from the duplicate dummy. This duplicate dummy corresponds in the number and arrangement of its parts to the dummy proper. The parts or pieces of the duplicate dummy are set directly from the keyboard, and the settings of the same for the entire line are transferred, by an instantaneous movement of the duplicate-dummy's frame, to the stops of the dummy proper. This duplicate arrangement of dummies permits the dummy proper to be at work controlling the matrix-making mechanism for a given line, while the duplicate dummy is being set from the keyboard by the next succeeding line. Hence the operation of the keyboard may be practically continuous.

Seventh. The parts of the duplicate dummy are set, as above stated, directly from the keys. This setting is effected by the coöperation with the keys of a setting-carriage having a set of three independently-movable pieces corresponding to the three members of the sets of pieces or stops on the dummies, a series of setting-slides having a corresponding number of striking-surfaces for action on the setting members of the carriage, and a power-driven setting-shaft under constant strain and under the control of an escapement-trip releasable by the keys. The setting-slides are in number equal to all the characters represented on the keyboard, and any one of the same is made to act on all the setting members of the setting-carriage by a set of bail-blades which overlie all the setting-slides and constitute the runways or supports for the factors of the setting-carriage. The feed movements of the setting-carriage to bring the same in line with the successive sets of the duplicate-dummy's pieces is effected by the setting-shaft which controls the setting-slides under the action of the keys.

Eighth. The justification: Inasmuch as preliminary representation of the entire desired line, as indicated on the keyboard, is had on the dummies, it is possible to effect justification of the matrix in various ways. In this machine, as shown and described, a supplemental feed device is provided which will vary the normal feed of the matrix-material holder to vary the spacing between words, so as to justify the line, if such variation in the spacing be necessary. The variation, if any, is uniformly distributed among all the spaces between all the words of the line. This supplemental feed mechanism and the devices for setting and controlling the same, taken collectively, are called the "justifier." The active parts of the same are set indirectly from the letter-space indicator and a word-space rack or register controlled from the keyboard, and subsequently come into effect under the control of the dummy to effect the variation in the feed of the matrix-material holder, if necessary, to justify the line.

Ninth. The casting mechanism is run in conjunction with the matrix-making mechanism and operates to cast a line of type from a previously-made matrix, while the matrix-making mechanism is operating, under the control of the dummy, to produce a matrix of a succeeding line.

Tenth. All the parts of the matrix-making mechanism which are heavy and would require any material loss of time in starting and stopping are kept in constant motion from a constantly-running power-shaft properly timed with respect to each other and the feed movements of the dummy, ready to act when the latter is thrown into action. This fact, together with the fact that the dies are independent and alineable at the impression-point by independently-movable carriers of light weight, permits the matrix-making mechanism to be run at a uniform and comparatively high rate of speed, effecting a considerable saving in time.

From the foregoing statements it will be seen that the machine herein shown and described involves three distinct sets of coöperating mechanisms, to wit:

First. The primary setting devices, from the keyboard to the duplicate dummy inclusive, by means of which the parts of the dummy proper are positioned or set with reference to each other for the selected line, so as to control the selection and the spacing of the dies. These primary devices also set the active parts of the justifier.

Second. The matrix-making mechanism, from the dummy proper to the justifier inclusive.

Third. The casting mechanism and parts directly coöperating therewith.

In the detailed description which will follow these mechanisms will be described substantially in the foregoing order, and their parts will be taken up and specified as nearly as is practicable in the order of their operation.

*Preliminary View of the General Operation.*

It will further help to understand and follow the detailed description by first taking a summary view of the operation of the machine as an entirety. This may be briefly stated as follows: The operator manipulates the keyboard exactly as in an ordinary typewriter. This results in positioning or setting the parts of the duplicate dummy and also in setting the letter-space indicator and the word-space rack or register, so that they will subsequently come into effect to set the other or active parts of the justifier. From the letter-space indicator the operator can see where he must stop or break his line. He then touches the starting-key, thereby throwing into action what is called the "auxiliary movement-shaft." The initial movement of this shaft transfers the settings of the duplicate dummy to the dummy proper and causes the letter-space indicator and the word-space rack or register to set the active parts of the justifier. To do this work, the duplicate dummy was raised and immediately returned to its normal position, thereby restoring all the parts of the primary setting devices into their respective normal positions ready for use for another line. Hence the operator can then immediately go forward on the keyboard selecting the next line. Coincidently with the return of the duplicate dummy to its normal position the dummy proper was started on its travel by the auxiliary movement-shaft. Thereafter it is fed toward the left by a step-by-step motion, bringing all the sets of its stops which have been positioned for use on the given line into action on the placing mechanism, and thereby controlling the alinement and impression of the dies and the feed of the matrix-material holder, so as to produce a justified matrix. When all the stops of the dummy which were set for use have done their work, the matrix-making mechanism is automatically rendered inoperative to produce any further impression and immediately thereafter the dummy is released and returned to its normal position. Coincidently with or before the return of the dummy proper all the parts of the matrix-material-feeding mechanism, including the active or set parts of the justifier, are returned to their normal position.

Contemporaneously with the operation of the matrix-making mechanism, under the control of the dummy, the casting mechanism was at work producing a cast or linotype from a previously-made matrix. During the same time an automatic filling device was at work loading an empty matrix-holder with a new strip of matrix material. These functions all having been completed, the auxiliary movement-shaft was automatically thrown out of gear with the constantly-running power-shaft. By this time the operator at the keyboard should have indicated or nearly indicated the next line and be about ready to again touch the starting-key. When this occurs, the drum which carries the matrix-material holders is given a quarter-turn, thereby bringing a holder with a new strip of matrix material to the impression-point, alining the matrix of the previously-made line with the mold at its casting position, ejecting an old or used strip of matrix material from which the cast had been taken, and alining the empty holder with the automatic filling device. The same automatic movement which gave the drum a quarter-turn threw the mold to the rear of its runway into its casting position. In other words, the movements which shift the matrix of the first line from the impression-point to its casting position occurs coincidently with the transfer of the settings from the duplicate dummy to the dummy proper, under the action of the auxiliary movement-shaft, for the next succeeding line.

Figure 2:
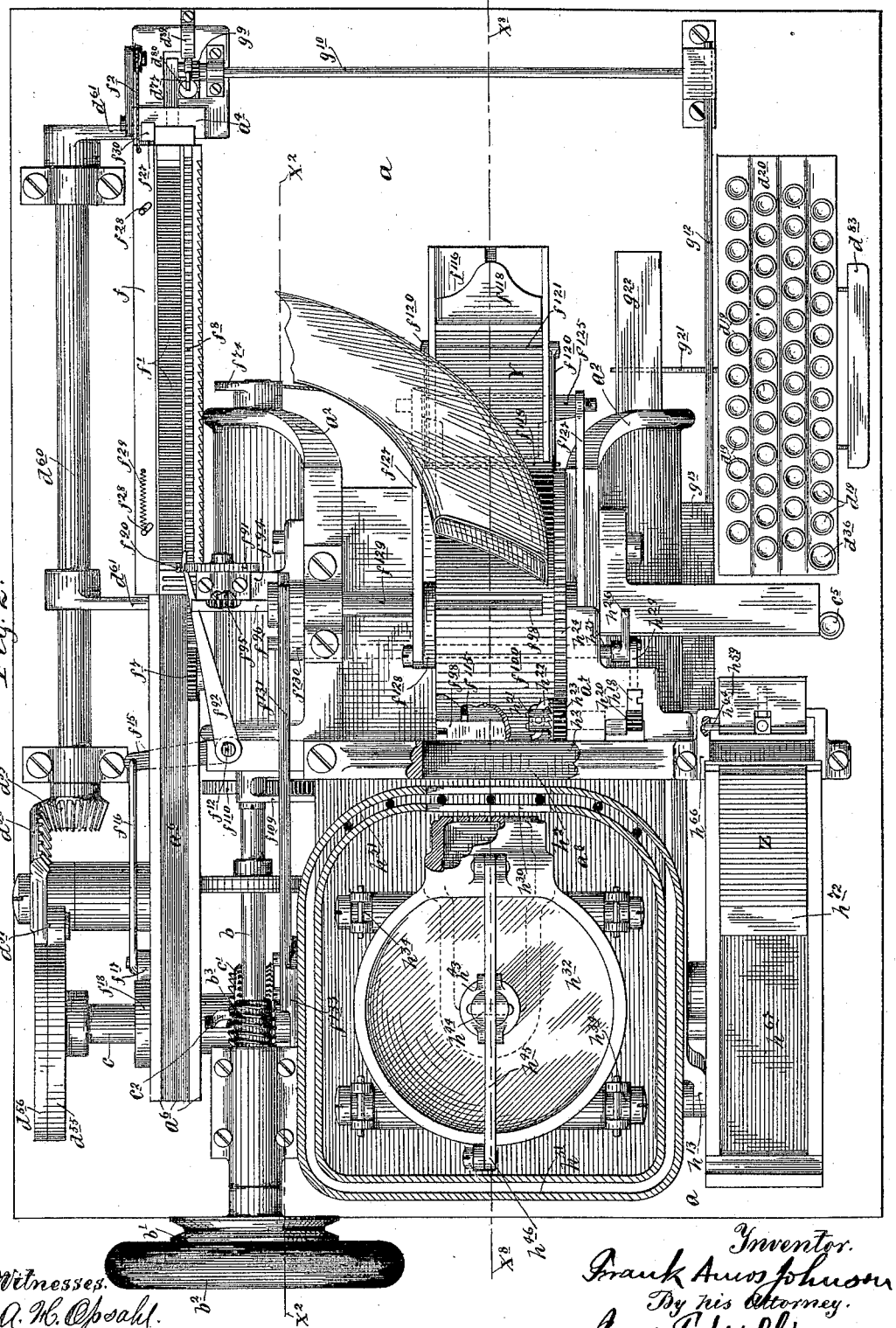
Figure 3:
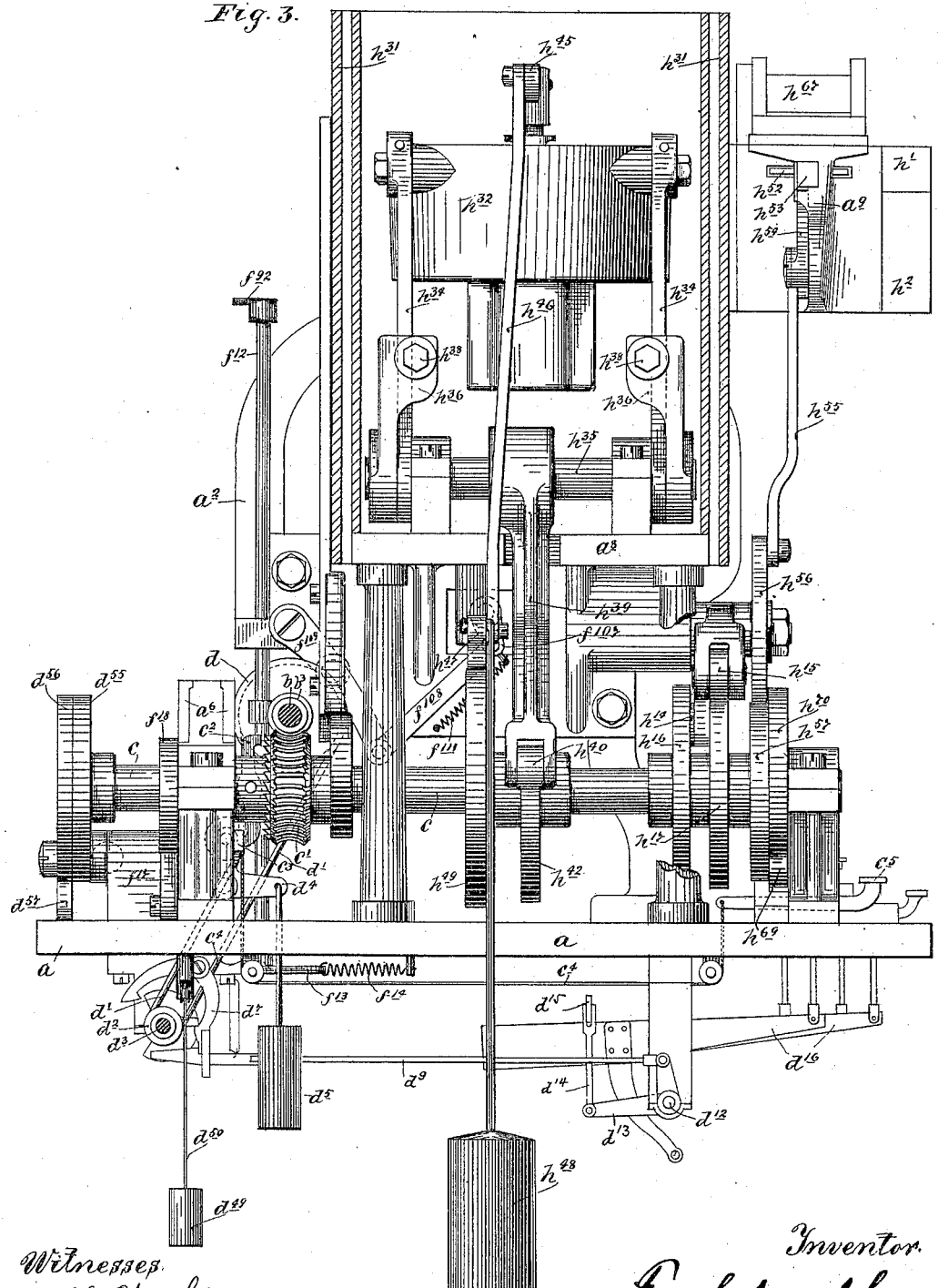
Figure 6:
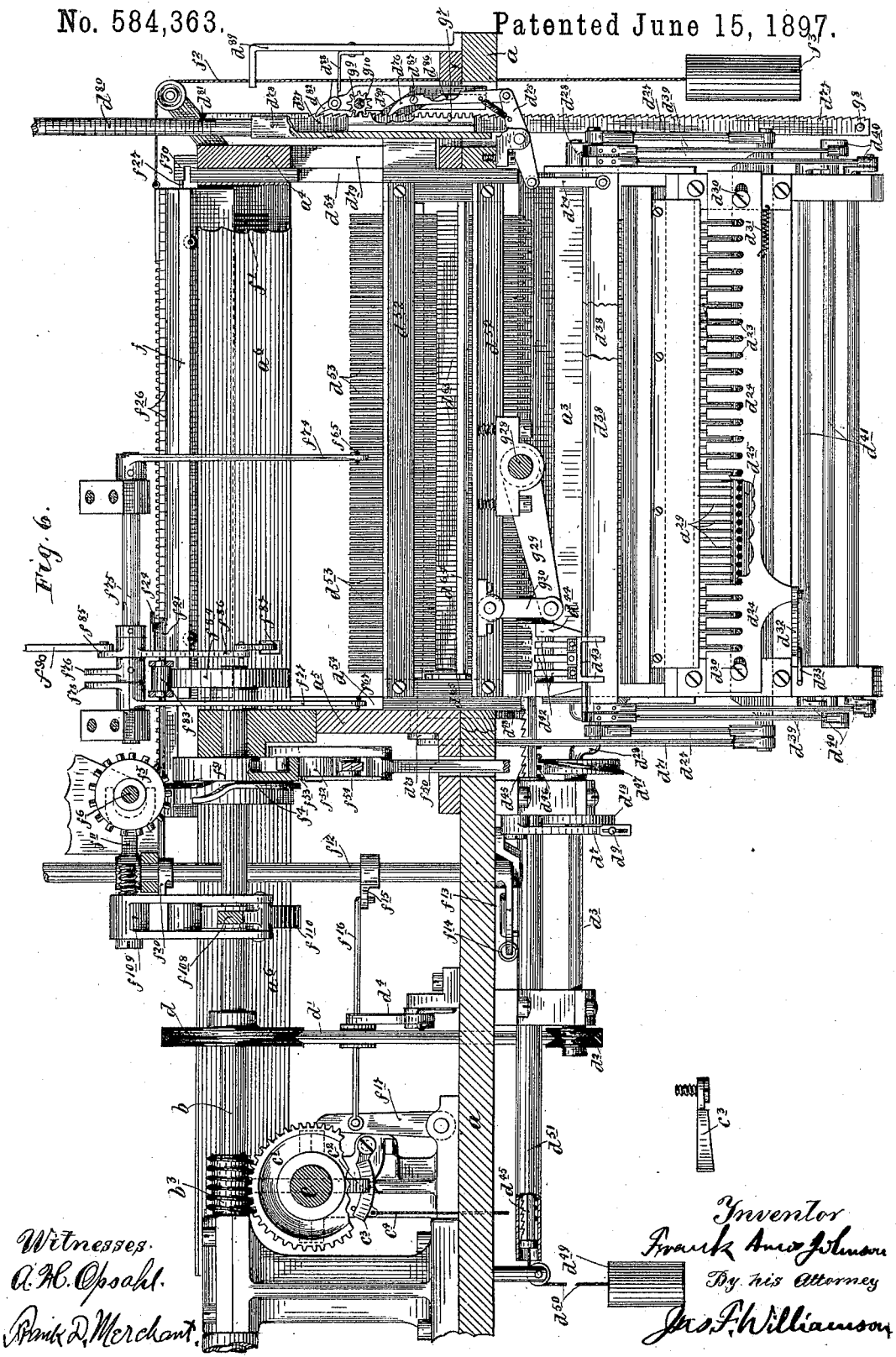
Figure 43:
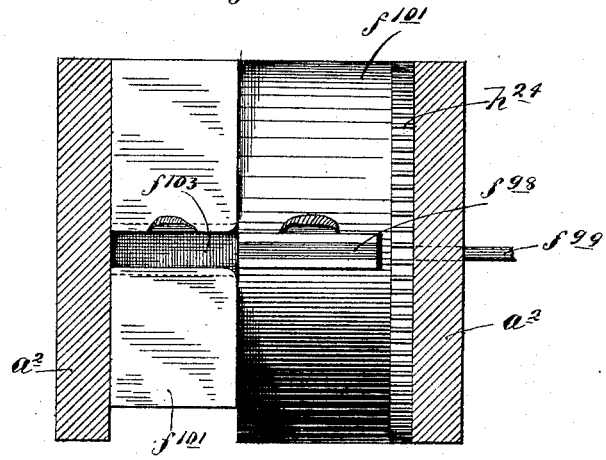
Figure 44:
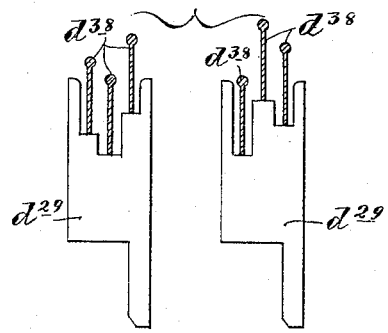

*Detailed description.*—In the accompanying drawings, Figure 1 is a front elevation, and Fig. 2 a plan view, of the entire machine. Directions will be taken with reference to these two figures from the position of an observer facing the front of the machine. Fig. 3 is a left end elevation of the machine, some parts being shown in section. Fig. 4 is a cross-section from front to rear through the bed-plate, slightly to the left of the keyboard, illustrating the trip mechanism for controlling the setting-shaft from the keys. Fig. 5 is a detail in section on the line $X' X'$ of Fig. 4. Fig. 6 is a vertical section of the machine, taken from right to left, approximately on the line $X^2 X^2$ of Fig. 2, with some of the supporting parts removed, looking from the front. Fig. 7 is a vertical section, taken from front to rear, approximately on the irregular line $X^3 X^3$ of Fig. 1, looking from the right. Fig. 8 is a detail in elevation, looking from the rear, showing the setting-carriage and some of its immediately-connected parts. Fig. 9 is a right end elevation of the parts shown in Fig. 8 with some parts broken away. Fig. 10 is a sectional view of the setting-carriage, taken on the line $X^4 X^4$ of Fig. 8. Fig. 11 is a detail in horizontal section showing the devices for shifting the key-rods to change from lower to upper case letters. Fig. 12 is a rear elevation of the right half of the machine, some parts being broken away and other parts being shown in diagram. Fig. 13 is a sectional view, and Figs. 14 and 15 are views in plan, illustrating the selecting-finger and its immediately-connected parts. Fig. 16 is a side elevation, and Fig. 17 a plan view, of the selecting-finger detached. Fig. 18 is a horizontal section through the central part of the machine, approximately on the irregular line $X^5 X^5$ of Fig. 7. Fig. 19 is an enlarged view, in vertical section, on the line $X^6 X^6$ of Fig. 18, illustrating the action of the dummy on the placing and feeding mechanism. Fig. 20 is a plan view of the same. Fig. 21 is a sectional view from front to rear, looking from the left, illustrating a part of the matrix-material-feeding devices. Fig. 22 is a plan view, and Fig. 23 an end view, of one of the matrix-material holders detached. Figs. 24 and 25 illustrate in plan and cross-section, respectively, one of the matrix-strips detached. Fig. 26 is a front view of a part of the justifier, some portions of the same being shown in section. Fig. 27 is a rear view of the same, some of the parts being shown in section and others broken away. Fig. 28 is a section on the line $X^7 X^7$ of Fig. 26, looking from the right, after the parts have been set and taken their initial movement. Fig. 29 is a detail of a trip device used as part of the mechanism shown in Figs. 26, 27, and 28. Fig. 30 is a vertical section taken from the left toward the right through the casting mechanism and a part of the matrix-making mechanism, approximately on the line $X^8 X^8$ of Fig. 2, looking from the front. Fig. 31 is a view in vertical section approximately on the line $X^9 X^9$ of Fig. 1, looking from the left, some of the parts being shown in diagram only and others removed. Fig. 32 is a top plan view of the lower guide rail or plate, and Fig. 33 a bottom plan view of the upper guide rail or plate, constituting together the runway for the mold. Fig. 34 is a bottom plan view of the mold detached. Fig. 35 is a side elevation of the mold, looking from the right; and Fig. 36 is a cross-section of the same on the line $X^{10} X^{10}$ of Fig. 35. Fig. 37 is a detail in front elevation illustrating a trip device used in connection with the matrix-drum and the mold-driving mechanism. Fig. 38 is a detail, partly in front elevation and partly in section, illustrating the devices for ejecting the linotype. Fig. 39 is a view in right side elevation of the device for receiving the ejected linotype and delivering the same to the galley. Figs. 40 and 41 are views in plan and side elevation showing the construction for holding the die from turning in its socket. Fig. 42 is a perspective view showing the product of the machine. Fig. 43 is a bottom plan of the matrix-carrying drum and the anvil-block, illustrating the bell-mouthed alining-channel into which the matrix-material holder moves when at the point of impression. Fig. 44 is a detail showing a pair of the setting-slides in side elevation and showing the bails on which the striking-surfaces of the said slides act for illustrating the variable action of the different slides.

*Classification of reference-letters.*—For convenience the following classification of reference-letters will be observed, to wit: $a$ and its powers, $a'$ $a^2$, &c., will be used to denote the framework; $b$ and its powers for the main shaft, &c., $c$ and its powers for the auxiliary movement-shaft, &c., $d$ and its powers for the primary setting devices, $f$ and its powers for the matrix-making mechanism, $g$ and its powers for the justifier, and $h$ and its powers for the casting mechanism. $y$ denotes the matrix material. $z$ denotes the product of the machine.

It may also be premised that the primary setting devices are located chiefly to the right of the center, that the matrix-making mechanism is for the most part located near the center, and the casting mechanism to the left of the center of the machine.

*Main frame.*—The main frame comprises a horizontal table or bed-plate $a$, supporting-legs $a'$; a two-part central support $a^2$, fixed to and projecting upward from the bed-plate; a bracket or plate $a^3$, depending from the bed-plate, near the rear margin of the same; vertical standards $a^4$ and $a^5$, spaced apart from each other and projecting upward from near the rear margin of the bed-plate; a pair of horizontal plates $a^6$, fixed to the vertical standards $a^4$ and $a^5$, extending nearly the entire length of the machine and constituting the dummy-runway, and various other projecting fixed parts which will be noted, so far as is necessary, in connection with the description of the other operative parts.

Bearings for shafts and similar minor supporting parts, which are necessarily implied and the construction of which is well understood, will not be specifically designated by reference-letters, except when desirable to facilitate the location of some operative part.

*The driving-shafts,* (see Figs. 1, 2, and 3.)—A constantly-running power-shaft $b$ is located at the rear left corner of the machine, extending lengthwise of the bed-plate, and is provided with a grooved driving-pulley $b'$ and balanced wheel $b^2$. This shaft $b$ is provided also with a worm $b^3$.

An auxiliary movement-shaft $c$ is arranged at right angles to the power-shaft, near the left end of the machine, and is provided with a loose worm-gear $c'$, which is constantly in engagement with the worm $b^3$ of the power-shaft. The loose worm-gear $c'$ has ratchet-teeth on its rear face, with which constantly tends to engage a spring-pawl $c^2$, pivoted in a slot of the auxiliary shaft. Hence whenever this pawl is permitted to engage with the ratchet-teeth on the worm-gear the auxiliary shaft will be driven by the gear. The pawl $c^2$ is normally held out of engagement away from the ratchet-teeth of the worm-gear by a pivoted wedge-faced spring-held trip-block $c^3$, Fig. 6. This trip-block is drawn down at will to throw the auxiliary shaft into action by connections $c^4$, extending over suitable guide-sheaves to a starting-key $c^5$, located on the bed-plate to the left of the keyboard proper. The wedge-face on the said trip-block $c^3$ coöperates with the tail end of the pawl $c^2$ to disengage the free end of the pawl from the ratchet-teeth of the worm-gear whenever the said shaft has made a complete revolution.

*The primary setting devices,* (see Figs. 1 to 11.)—The power-shaft $b$ has secured thereto at a point to the right of the auxiliary shaft a driving-sheave $d$, which is connected by a belt $d'$ with a sheave $d^2$ on the left end of a horizontally-arranged setting-shaft $d^3$, located in suitable bearings below the bed-plate. The said belt is held under the proper tension by a belt-tightener $d^4 d^5$. The relative sizes of the driving-sheave $d$ and the driven sheave $d^2$ are such as to multiply the speed from the power-shaft and move the setting-shaft $d^3$ when it is released at a very high rate of speed. This setting-shaft $d^3$ is, however, normally held from turning by a rigid stop-arm $d^6$ thereon, the free end of which normally engages with a shoulder of a pivoted stop-lever $d^7$, Figs. 4 and 5. The latch-head $d^8$ of a trip-rod $d^9$ works through a slot in the lower end of the stop-lever $d^7$ and is normally held in its uppermost position and in engagement with the rear face of the said stop-lever by a spring $d^{10}$. At its forward end the trip-rod $d^9$ is connected to a crank-arm $d^{11}$ on an idle-shaft $d^{12}$, which has a pair of crank-arms $d^{13}$, connected by rods $d^{14}$ with a common bail-bar $d^{15}$, held down by spring $d^{15\frac{1}{2}}$ and overlying the rear portions of all the key-levers $d^{16}$, Fig. 7. The hub of the pivoted stop-lever $d^7$ has formed integral therewith a returning-arm $d^{17}$, which is of curved form and lies in a different vertical plane from the said stop-lever. The hub of the stop-arm $d^6$ has formed integral therewith a segmental cam-disk $d^{18}$ in position for action on the free end of the returning-arm $d^{17}$. Normally these parts stand as shown in Figs. 3 and 4, and the driving-belt $d'$ slips over the sheave $d^2$, but whenever a key is struck the trip-rod $d^9$ and the stop-lever $d^7$ are drawn toward the front, permitting the stop-arm and setting-shaft to escape and make a complete revolution, when they will be again intercepted and positively stopped. This is insured as follows: When the stop-arm $d^6$ is released, it strikes on its downward movement the projecting end of the latch-head $d^8$, unlatching the same from the stop-lever $d^7$, leaving the said stop-lever free to return to its normal position, regardless of the position of the key-lever. Immediately thereafter and before the stop-arm and setting-shaft make a complete turn the cam-disk $d^{18}$ will strike the free end of the returning-arm $d^{17}$ and positively force the stop-lever $d^7$ back into its normal position to intercept the stop-arm $d^6$. When the key is released, it returns to its normal position, allowing the spring-pressed bail-bar $d^{15}$ to lower and throw the trip-rod $d^9$ and the latch-head $d^8$ toward the rear into its normal position into engagement with the lower end of the stop-lever $d^7$.

The key-levers $d^{16}$ have at their forward ends finger-pieces $d^{19}$, the stems of which work through vertical holes in the bed-plate and the key-box $d^{20}$. The key-levers rest on a knife-edge fulcrum $d^{21}$ and are heaviest at their rear ends, so that they will remain in their normal positions by gravity.

The key-levers have attached to their rear portions downwardly-extended crank-arms $d^{22}$, to which are pivotally attached key-rods $d^{23}$. The free ends of these rods work through notches of a guide plate or comb $d^{24}$, Figs. 6, 7, and 11, and in position to enter holes of and be lifted by a vertically-movable bar $d^{25}$, the ends of which bar pass outward through slots $d^{26}$ in the ends of the depending plate or bracket $a^3$ and are connected by rods $d^{27}$ with cranks $d^{28}$ on the setting-shaft $d^3$.

Directly above the key-rods $d^{23}$ and in the same vertical plane with the holes in the bar $d^{25}$, but in advance of the said bar, are located a series of setting-slides $d^{29}$, corresponding in number to all the characters of the keyboard and double the number of the key-rods. The key-levers and key-rods are in number one-half the total number of characters which can be selected on the keyboard.

The guide plate or comb $d^{24}$ is mounted for a slight longitudinal movement by means of slot-and-screw connections with the bracket or plate $a^3$, as shown at $d^{30}$, and is normally held at the extreme right by a spring $d^{31}$. When in this position, the rods and keys will operate to set such of the pieces $d^{29}$ as will select lower-case letters. The comb and rods are shiftable at will toward the left against the tension of the spring $d^{31}$ by means of a bell-crank $d^{32}$ and a rod $d^{33}$, connected to a depending crank-arm $d^{34}$ of a shift or cap key-lever $d^{35}$, having a finger-piece $d^{36}$ located at the extreme left of the keyboard. When thus shifted, the key-rods will operate to select upper-case letters or numbers. It should be noticed that the shift key-lever $d^{35}$ does not extend under the common trip-bail $d^{15}$ like the character-keys, but stops short of the same.

The setting-slides $d^{29}$ work between lips on the face of the depending plate $a^3$ and on the back of a front guide plate or rail $d^{37}$ and are notched or otherwise cut away at their upper ends, so as to form three striking-surfaces which work against three vertically-movable bail-blades $d^{38}$. These bail-blades are held so that their opposite ends will take equal vertical motion by means of rods $d^{39}$, connected at their lower ends to crank-arms $d^{40}$ on a corresponding set of idle-shafts $d^{41}$.

Whenever any one of the slides $d^{29}$ is raised it will operate on all the bails $d^{38}$ and through the same on the setting members of the setting-carriage which ride on the said bails, thereby correspondingly moving the pieces or stops of the duplicate dummy then in line with the setting members of the said carriage, as will presently appear. The slides $d^{29}$ are differently cut away, so that their striking-surfaces will raise the bails $d^{38}$ into the proper positions to properly locate or set the pieces of the duplicate dummy. In other words, each die-selecting member in each set of the duplicate dummy may take any one of ten different positions and the spacing member thereof may take any one of six different positions, according to the particular die that is to be selected. Hence the slide $d^{29}$ corresponding to any particular character on the keyboard must be cut away, so that its striking-surfaces will be of the proper height to properly position the members of the duplicate dummy. The relation of these parts is shown in Figs. 7, 8, 9, 10, and 44.

*The setting-carriage,* (see Figs. 6 to 10.)—Directly above the setting-slides $d^{29}$ is located the setting-carriage, consisting of three spring-held vertical fingers $d^{42}$, pivoted at their lower ends to three corresponding forked base-pieces $d^{43}$, which ride one on each of the bail-blades $d^{38}$, and, further, consisting of a recessed and forked rack-head $d^{44}$, the prongs or jaws of which embrace all the base-pieces $d^{43}$ and depend between the blades $d^{38}$ and a feed-rack $d^{45}$, rigidly attached to the head $d^{44}$ and extending toward the left of the machine. The feed-rack $d^{45}$ has on its rear vertical face projecting studs $d^{46}$, which engage with a semicircular cam-flange $d^{47}$ on the setting-shaft $d^3$. When the setting-shaft is in its normal or locked position, the cam-flange $d^{47}$ is out of engagement with the studs $d^{46}$ of the feed-rack, and the feed-carriage is held by a spring-held pawl $d^{48}$ against the strain of a weight $d^{49}$, connected to the left end of the feed-rack by a cord $d^{50}$. The body of the feed-rack $d^{45}$ moves within a tubular casing or shield $d^{51}$. Normally the setting-carriage stands at the extreme left and it is fed toward the right by the cam-flange $d^{47}$ one step at each turn of the setting-shaft and during the latter half of the said shaft's movement.

The fingers $d^{42}$ of the setting-carriage do not lie in a straight line taken crosswise of the setting-carriage, but are located one in advance of the other, for a purpose which will presently appear.

*The duplicate dummy,* (see Figs. 6, 7, and 8.)—Located directly above the setting-carriage in position to be operated upon thereby is the duplicate dummy, consisting of the frame $d^{52}$ and a series of vertically-movable pieces $d^{53}$, carried thereby, which work in sets of three pieces each. Two pieces of each set take positions for setting corresponding parts of the dummy proper in position for the selection of a given die and the third piece of the set takes a position for setting a corresponding part of the dummy proper in position for spacing the impression of the selected die. There are enough of these sets of pieces $d^{53}$ for a line of maximum length.

The duplicate-dummy's frame $d^{52}$ has projecting ends which work in grooves or guideways $d^{54}$ in the vertical standards $a^4$ and $a^5$, for permitting the duplicate dummy to be raised and lowered at the proper time. This vertical movement is effected by a pair of cams $d^{55}$ and $d^{56}$ on the auxiliary movement-shaft $c$, through a two-pronged cam-lever $d^{57}$, Fig. 12, having a sector-gear $d^{58}$ in engagement with a beveled gear $d^{59}$ on an idle-shaft $d^{60}$, which has a pair of sectors $d^{61}$, which engage with rack-teeth $d^{62}$ cut on the rear vertical faces of the duplicate-dummy's frame. The said cam $d^{55}$ lifts the duplicate-dummy and the other cam $d^{56}$ lowers the same at the proper times.

The pieces $d^{53}$ of the duplicate dummy have ratchet-teeth on their front edges, with which normally engage individual spring-pawls $d^{63}$, projecting from a common shaft $d^{64}$. This shaft has an arm $d^{65}$, which is engaged and held by a latch $d^{66}$ to hold the said pawls in their active position. Hence the pieces or stops $d^{53}$ will be held by the said pawls in whatever relative position they may be set on their supporting-frame. The shaft $d^{64}$ is under tension from a spring $d^{67}$ to rock toward the front when released from the latch $d^{66}$. This latch is released, permitting the said shaft to rock at the proper time, by a spring trip-finger $d^{68}$, projecting from the bed-plate, with which the free end of the latch engages on the downward or return movement of the duplicate-dummy's frame. On the upward movement of the said frame the said latch simply cams the free end of the said trip-finger forward out of its path, permitting the frame to pass. When the shaft $d^{64}$ is released from the latch $d^{66}$, as just described, on the downward movement of the duplicate-dummy's frame the stops or pieces $d^{53}$ are permitted to fall into their normal positions by gravity. At the extreme of the duplicate-dummy's downward or return movement the said pawl-shaft $d^{64}$ is again thrown backward by a crank-like projection $d^{69}$, which strikes a projecting part of the bed-plate and throws the arm $d^{65}$ under the latch $d^{66}$, causing the pawls $d^{63}$ to again become active.

The stops or pieces $d^{53}$ of the duplicate dummy are positioned or set by the setting-carriage. To prevent these stops from being thrown beyond their proper positions by the effect of momentum, a pivoted stop-blade $b^{70}$ is located on the frame directly behind the entire series of said pieces, in position to be thrown at the proper time into engagement with stop-notches on the rear faces of the same. This stop-blade is actuated to do this work at the proper times by a vertically-arranged finger $d^{71}$, connected at its lower end to the vertically-movable bar $d^{25}$ and having at its upper end an open bell-mouthed cam-slot $d^{72}$, which engages with the pin of a crank-arm $d^{73}$, carried on the left end of the pawl-blade $d^{70}$. The cam-slot $d^{72}$ is so shaped that at all times except at the extreme of its upward movement it will hold the pawl-blade $d^{70}$ in its inactive position; but at the extreme of its upward movement it will throw the said blade forward and arrest the said stops in their proper positions.

One of the three bails $d^{38}$, which is shown as the front member of the set, has a link $d^{74}$, connected to the inner end of a lever $d^{75}$, pivoted to a projecting lug fixed to the bed-plate and carrying at its outer end a spring-held driving-pawl $d^{76}$. This driving-pawl normally engages an indicator-rack $d^{77}$, which is mounted for vertical movement in a head-block $d^{78}$, which is rigidly secured to a part of the duplicate-dummy's frame and projects through a slot $d^{79}$ in the right-end vertical guide-standard $a^4$. The head-block $d^{78}$ terminates in an indicator-scale $d^{80}$, and the indicator-rack carries at its upper end a pointer $d^{81}$, which moves over the graduated face of the scale. The rack seat or groove in the head-block $d^{78}$ is extended upward along the right-hand face of the indicator-scale. The indicator-rack is held wherever set by a spring-held retaining-pawl $d^{82}$. The said front member of the bails $d^{38}$ is the spacing-bail and through the parts just described will indicate on the scale the total amount of letter-space required by the selected characters and the normal spaces between the words, as indicated on the keyboard. It should be noted in this connection that the space-bar $d^{83}$ has the same connections as the key-levers proper and operates on the setting shaft and carriage in the same way as the character-keys. It has also other additional connections pertaining to the justifier, which will be described later on.

*The operation of the primary setting devices.*—The general action or operation of the primary setting devices may now be traced. As the keys are struck by the operator the corresponding key-rod $d^{23}$ will be thrown backward into a corresponding hole of the vertically-movable bar $d^{25}$ and will be carried upward by the said bar, and through the trip-bail $d^{15}$ the setting-shaft $d^3$ will also be released and make one turn, which, through connection $d^{27}$ and $d^{28}$, raises the bar $d^{25}$. On its upward movement the rod strikes the lower end of a corresponding setting-slide $d^{29}$ and carries the same upward therewith. The three striking-surfaces at the top of the setting-slide strike the corresponding bails $d^{38}$ and raise the fingers $d^{42}$ of the setting-carriage into contact with the lower ends of the corresponding set of the duplicate-dummy's stops or pieces $d^{53}$, thereby setting the same in their proper relative positions on their supporting-frame. On the upward movement of the front or spacing member of the bails $d^{38}$ the driving-pawl for the indicator-rack is drawn downward to obtain its throw and on the return movement of the said spacing-bail the said driving-pawl is thrown upward, carrying with it the indicator-rack, registering and indicating the letter-space required for the selected character or the normal spacing between words. The setting-carriage normally stands at the extreme left, as was hitherto stated, as shown in Fig. 6, and is fed toward the right. It acts first on the left-hand set of the duplicate-dummy's pieces or parts $d^{53}$. During the latter half of the setting-shaft's revolution and while the bar $d^{25}$ is being lowered the setting-carriage is fed to the right one step by the cam-flange $d^{47}$, thus bringing the setting-fingers in position for action on the next set of stops of the duplicate dummy. This action is repeated for every selected character and for every stroke of a spacing-key on the keyboard, resulting in positioning the sets of stops or pieces $d^{53}$ of the duplicate dummy on their supporting-frame for the entire selected line.

The operator can see from the indicator-scale when his line is full or so approximately full that he must stop any further selection of characters on the keyboard. He then touches the starting-key $c^5$, throwing the auxiliary movement-shaft $c$ into action. The duplicate dummy is thereby immediately raised upward to its limit and again returned downward to its normal position by the cams $d^{55}$ and $d^{56}$ and their connections to the duplicate-dummy's frame. The upward movement of the duplicate dummy transferred its settings from the pieces $d^{53}$ to corresponding parts of the dummy proper, which will soon be described.

The vertical movements of the duplicate dummy released all the parts of the primary setting devices, which had in any way been set or changed, permitting them to return or causing them to return to their original normal positions ready for renewed action.

The release of the setting-carriage is effected on the upward movement of the duplicate-dummy's frame by a cam-slot $d^{84}$ in the left end of the frame, in which works a pin $d^{85}$ of the feed-carriage-retaining pawl $d^{48}$. This retaining-pawl is pivoted to a part of the supporting-standard $a^5$. Hence when the duplicate-dummy frame moves upward its initial movement will throw the retaining-pawl out of engagement with the feed-rack $d^{45}$, permitting the setting-carriage to be returned to the extreme left by its cord and weight into its normal position.

The projecting head $d^{78}$ from the duplicate dummy has a cam-surface $d^{86}$, which on the upward movement of the frame strikes a projecting pin $d^{87}$ on the rack-driving pawl $d^{76}$, throwing the same out of engagement with the indicator-rack and holding it out until the return of the said frame. The indicator-rack's retaining-pawl $d^{82}$, when in its normal position, is made active by a spring-finger $d^{88}$, projecting inward from a trip-post $d^{89}$. At the extreme limit of the duplicate-dummy's upward movement the tail end of the retaining-pawl $d^{82}$ is engaged by the inturned end of the trip-post $d^{89}$, thus releasing the indicator-rack and allowing the same to drop by gravity to its normal position.

It should be noted that the driving-pawl $d^{76}$ for the indicator-rack works with its free end against an inclined surface of a banking-block $d^{90}$, which, when the pawl is at the extreme limit of its throw, holds the pawl in mesh with the rack, thereby preventing the racing or overthrow of the rack by momentum and insuring an accurate setting of the rack.

It has already been stated that the parts or pieces $d^{53}$ of the duplicate dummy are released from their retaining-pawls $d^{63}$ on the pawl-shaft $d^{64}$ at the initial part of the return movement of their supporting-frame, allowing the said pieces to fall by gravity on the frame into their lowermost or normal position, and that at the limit of the frame's return movement the said retaining-pawls are again latched up into their active position. All the parts of the primary setting devices are now back in their normal position, and the operator may proceed at the keyboard in the selection of the characters for the next line. The vertical movements of the duplicate dummy occurred during, say, the first sixty degrees movement of the auxiliary movement-shaft $c$, requiring about one second of time.

Before leaving the primary setting device it should be noted and remembered that the space-bar $d^{83}$ and the indicator-rack $d^{77}$ have connections with and are material parts of the justifying mechanism, which will be described later on.

It will be seen that the whole purpose of the primary setting devices is to position or set the parts or pieces of the dummy proper for the entire selected line, so that the said dummy may be used to control the matrix-making mechanism and also to set certain parts of the justifier, as will be traced later on. The dummy and its action on the matrix-making mechanism will now be traced.

Matrix-Making Mechanism.

*The dummy proper*, (see Figs. 1, 2, 6, 7, 18, 19, and 20.)—The dummy proper comprises a frame $f$, having mounted thereon with freedom for vertical movement a series of pieces or stops $f'$, corresponding in number and arrangement to the parts or pieces $d^{53}$ of the duplicate dummy. These stops $f'$ of the dummy proper also work in sets of three pieces, as stated in the general description, two of which serve, as will presently appear, to select the die, and the third to control the matrix-material-feeding device to space the impression of the selected die. The spacing member of each set of stops also serves to control the feed of the matrix material to give the normal spacing of two units between words of the line.

Normally the dummy is held at the extreme right of its runway $a^6$ by means of a cord and weight $f^2$ and $f^3$, and is fed toward the left against the strain of the said weight by a cam-flange $f^4$ on the constantly-running power-shaft $b$. The cam-flange $f^4$ engages a pin-wheel $f^5$, loosely mounted on a short idle-shaft $f^6$. This shaft $f^6$ has a pinion $f^7$ in mesh with the feed-rack $f^8$ cut on the top surface of the front plate of the dummy-frame and extending to the left beyond the left end of the dummy-frame. The pin-wheel $f^5$ has on its rear hub a half-clutch $f^9$. A corresponding sliding half-clutch $f^{10}$ is mounted on the idle-shaft $f^6$ and is held to move therewith by means of a groove and feather in the ordinary way. The sliding half-clutch is engaged by a shipper-fork $f^{11}$ on a vertical trip-shaft $f^{12}$, extending down through the bed-plate and provided below the same with a crank-arm $f^{13}$, which is held by a spring $f^{14}$, connecting the same with the bed-plate. This spring, through the parts just described, normally holds the sliding half-clutch in its open or inoperative position. The trip-shaft $f^{12}$ has above the bed-plate another crank-arm $f^{17}$, the free end of which works against a cam $f^{18}$ on the auxiliary movement-shaft $c$ near the rear end of the same. (For these parts see especially Figs. 2, 6, 12, and 18.)

At the proper time after the auxiliary shaft $c$ has been thrown into action the cam $f^{18}$ throws the cam-lever $f^{17}$ toward the right, thus rocking the trip-shaft $f^{12}$ against the strain of the spring $f^{14}$ and throwing the shipper-fork $f^{11}$ toward the front, closing the half-clutches, and thus rendering the idle-shaft $f^6$ and its pinion $f^7$ active on the feed-rack $f^8$ to effect the feed of the dummy.

The instant that the sliding half-clutch was thrown forward into its active or closed position a spring-pressed latch $f^{19}$ engaged a stop-lug $f^{20}$, projecting from the left end of the shipper-fork, thus locking the sliding clutch in its closed position. The free end of this spring-latch $f^{19}$ extends to the rear beyond the shaft $f^{12}$ in position to be engaged and released at the proper time by a sliding trip-pawl $f^{21}$, the left end of which is suitably guided by a slot $f^{22}$ in the finger and a fixed pin $f^{23}$. The right-hand end of this trip-pawl $f^{21}$ is provided with a shoe $f^{24}$. This shoe $f^{24}$ rides against the front face of such of the dummy-stops $f'$ as have been set for use under tension from a spring $f^{25}$. When the shoe passes such of the stops of the dummy as have been set for use, it is forced backward by its spring over the top of the unset stops, permitting the trip-pawl $f^{21}$ to engage with the ratchet-teeth $f^{26}$ on the front plate of the dummy-frame. The trip-pawl $f^{21}$ will thereby be thrown toward the left by the continued movement of the dummy, causing the trip-finger to throw out the latch $f^{12}$ from under the stop-lug $f^{20}$ of the shipper-fork $f^{11}$, allowing the retracting-spring $f^{14}$ to become active to throw the sliding half-clutch into its normal or idle position. In other words, the dummy is immediately thrown out of action the instant that all of the stops which have been set for use have done their work. When this sliding half-clutch is thus opened after the dummy has done its work, the dummy is instantly released and is free to be returned to its normal position by its cord and weight. The time when this occurs relative to the other parts will again appear later on.

As before stated, the dummy when in its normal position stands directly above the duplicate dummy. The stops $f'$ of the dummy have ratchet-teeth on their rear faces, with which engage a spring-held sliding lock-blade $f^{27}$, which works in a seat or groove on the rear plate of the dummy-frame. These ratchet-teeth on the stops $f'$ are sufficient in number for all the positions which the said stops might be required to take for the selection of any die and the proper spacing of the same. The same remark also applies, as has hitherto appeared, to the pieces or stops $d^{53}$ of the duplicate dummy. This lock-blade $f^{27}$ has slot-and-stud connections with the dummy-frame, as shown at $f^{28}$, and is normally held to move toward the right into its locking position by a spring $f^{29}$. The slots in the frame through which the studs from the lock-blade work are at such an angle that they form cam-surfaces which, under the sliding movement of the blade, force the blade into and out of engagement with the ratchet-teeth on the stops. When the dummy proper is in its idle or normal position, this lock-blade $f^{27}$ is held in an inactive or idle position against the strain of the spring $f^{29}$ by an idle trip-plunger $f^{30}$, mounted for vertical movement in the right-hand standard $a^4$. This trip-plunger has a notch directly below its stop-surface to permit the lock-blade to be moved by its spring when the plunger is lifted. When the duplicate dummy is raised, as hereinbefore described, to transfer its settings to the dummy proper, a part of the duplicate-dummy's frame strikes the lower end of the said trip-plunger at the limit of its upward movement, lifting the plunger and tripping the lock-blade into its active position, so that it will engage and secure the stops $f'$ of the dummy proper in whatever position they may have been set by the corresponding parts or pieces of the duplicate dummy. Hence by the raising of the duplicate dummy the stops $f'$ of the dummy proper will be variably set or positioned on their supporting-frame for the entire line, as may be required to control the location of the selecting-finger, (hereinafter to be noted,) so as to select the proper corresponding dies.

As soon as the dummy proper starts on its travel the trip-plunger $f^{30}$ falls back into its normal position, where it will again intercept the lock-blade $f^{27}$ on the return of the dummy and throw the said blade into its inactive or normal position and allow the stops of the dummy to fall by gravity into their normal position on the dummy-frame.

The principal parts of the dummy proper have now been designated, together with the means by which it is fed forward under the placing mechanism to do its work and the means by which it is tripped out of action and all its parts returned into their normal positions, but before tracing the action of this dummy it will be necessary to specify in detail the other parts of the matrix-making mechanism.

*The dies*, &c., (see Figs. 7, 30, 40, and 41.)— The dies $f^{31}$ are spring-seated for axial movement in the free ends of radial carriers or die-levers $f^{32}$, which work through radial slots of a truncated dome $f^{33}$, and also through vertical slots of a tubular guide-casting $f^{34}$, and are pivoted at their inner and lower ends to a plunger-tube casting $f^{35}$, located at the axial center of the dome and having an expanded base. This casting $f^{35}$ and the dome $f^{33}$ are rigidly secured to a shelf $f^{36}$, which is secured to and spans the space between the central supports $a^2$. The die-carriers are thrown to the center of the dome as the common center or impression-point, thereby bringing the dies into position to be acted upon by a reciprocating impression-plunger $f^{37}$, mounted within the hollow casting $f^{35}$ as a guide. The slots in the dome and the slots in the guide-casting $f^{34}$ serve as guides to the die-carriers for directing the same in their radial movements. The die-stems are convex at their lower ends and the plunger-head is concave. The dies when thrust upon by the plunger and impressed into the matrix material work through a guiding-aperture or truing-hole $f^{38}$ in a rigid resistance and alining plate $f^{39}$, located directly above the plunger with its guiding-aperture in the axial line of the same. This guiding-aperture or truing-hole is bell-mouthed and conformed in shape to the head of the die. In virtue of this construction the lower end or stem of the die is centered by the said truing-hole in the alining-plate, thus insuring the exact alinement of the impressions. The die-levers have near their free ends projecting lugs $f^{40}$, which, when the die is at the impression-point, strikes the under surface of the alining-plate and takes the strain from the plunger when the die is impressed. The die-heads are rectangular and flat clips $f^{40\frac{1}{2}}$, fixed to the carrier-levers, bear against one of the vertical faces of the same and prevent the dies from turning in their seats.

The matrix material (shown at $y$ in Fig. 7) is mounted on a suitable holder, which is fed from the front toward the rear across the top of the alining-plate $f^{39}$ and directly over the aperture $f^{38}$ to receive and space the impressions from the dies by means which will be presently described.

*The die-alining or carrier-operating rods and the striker-plate*, (see Figs. 7, 13, 18, 30, and 31.)—A series of operating-rods $f^{41}$ are located with their upper ends directly under the lower portions of the die-levers and extend downward through holes in the base of the plunger-guide casting $f^{35}$ and the shelf $f^{36}$ and have their terminals at their lower ends arranged in groups on a bifactored principle within the bottom plate $f^{42}$ of a rod-box $f^{43}$, depending from the shelf $f^{36}$. This guide-plate holding the terminals of the said operating-rods may hereinafter, for distinction, be called the "terminal" plate. The operating-rods $f^{41}$ are mounted with freedom for vertical movement and are held from downward displacement under the action of gravity by suitable stop-lugs (not shown) located thereon above any of the guide plates or castings through which they pass. The groups formed by the terminals of the said operating-rods as held in the terminal plate are in rectangular arrangement, forming rows in two directions, as shown in Fig. 18. Directly below the terminal plate of the rod-box is located a reciprocating striker-plate $f^{44}$, having attached to its under surface a stem or plunger $f^{45}$, which is square in cross-section and works within a suitable guide $f^{46}$, extending down through the bed-plate. At its lower end the plunger $f^{45}$ is connected by a link $f^{47}$ with the spring-arm $f^{48}$ of a pivoted lever $f^{49}$, the other end of which is provided with a cam-rod $f^{50}$, the upper end of which is in engagement with a profile cam $f^{51}$ on the power-shaft $b$. The engagement with this cam is effected by an exterior roller $f^{52}$ and an interior pin $f^{53}$. The cam-rod $f^{50}$ is held in its proper working position by a link $f^{54}$. As the power-shaft $b$ is in constant motion, the striker-plate will be given by the cam $f^{51}$ a complete stroke up and down at every turn of the said shaft.

*The selecting-finger and its placing mechanism*, (see Figs. 13 to 17 and Figs. 7, 18, 19, and 20.)—On the face of the striker-plate $f^{44}$ rests the selecting-finger $f^{55}$, with freedom for universal movement thereon. The disk-like base of the finger works on the face of the striker-plate, while the stem or finger proper projects through a slot $f^{56}$ in an idler $f^{57}$, which is pivoted at its right-hand end to a projecting part of the striker-plate and has its left or free end working under a retaining-flange $f^{58}$, projecting from the left margin of the striker-plate. This idler and slot preserves the vertical position of the selecting-finger and holds the same in its working position against the face of the striker-plate. Directly under the rod-box and above the said striker-plate are mounted a pair of horizontal slides $f^{59}$ and $f^{60}$, arranged for movement at right angles to each other and suitably held and guided by keepers $f^{61}$, secured to the lower edges of the rod-box. The slide $f^{59}$ has an elongated slot $f^{62}$, extending parallel with the slide $f^{60}$, and the slide $f^{60}$ has a corresponding slot $f^{63}$, extending parallel with the slide $f^{59}$. Both of the slots $f^{62}$ and $f^{63}$ embrace or engage the upper end of the selecting-finger $f^{55}$, and each slot is of sufficient length to permit the extreme movement of the other slide. The slide $f^{59}$ is normally held at the extreme right against the tension of a spring $f^{64}$ by a cord $f^{65}$ and the slide $f^{60}$ is held to the rear against the tension of a spring $f^{66}$ by a cord $f^{67}$. These cords are held taut and released at the proper times by means which will be presently described. When the selecting-finger and its immediately-connected parts are in their normal positions, as shown in the drawings, the selecting-finger will be directly under an empty hole $f^{68}$ in the terminal plate $f^{42}$ at a point outside of and beyond the groups of operating-rods. When in this position, the selecting-finger may be moved up and down by the striker-plate $f^{44}$ without any effect on the operating-rods or die-levers. By the movement of the slides $f^{59}$ and $f^{60}$, under the action of their respective springs $f^{64}$ and $f^{66}$ when released, the selecting-finger may be made to take any desired position on the striker-plate, so as to bring the same into line with the terminal of any desired one of the die-operating rods $f^{41}$. The various positions which the selecting-finger will take in making these selections of the die-operating rod are shown at the intersections of the lines of the diagram shown on the face of the striker-plate in Fig. 15. The slides will place the finger approximately in the proper position. The guide-holes, through which the die-operating rods work in the terminal plate, are bell-mouthed at their lower ends, as shown at $f^{69}$ in Fig. 13. Hence when the finger is raised by the striker-plate it will be finally alined by the bell-mouthed guide-hole under the selected die-operating rod. When the finger is driven up in this way by the striker-plate, it will raise the selected die-rod and throw in the corresponding die-lever to the impression-point. The striker-plate has connected therewith, by vertical rods $f^{70}$, extending upward through the shelf $f^{36}$ as a guide, a return-ring $f^{71}$, which surrounds the plunger-guide casting and overlies the lower ends of all the die-levers. When the striker-plate is raised, this ring $f^{71}$ is also lifted clear from the die-levers, permitting to the same a freedom of radial movement under the action of the operating-rods $f^{41}$, and on the return of the striker-plate the ring $f^{71}$ is drawn down therewith, thus positively insuring the return of the die-levers to their normal position.

The cord $f^{65}$ passes around a suitable guide-sheave $f^{72}$ on a post $f^{73}$, fixed to the bed-plate to change its direction, and is connected to the lower end of a placing-lever $f^{74}$, depending from the right end of an idle-shaft $f^{75}$. This lever $f^{74}$ is rigid on the shaft $f^{75}$, and the said shaft carries near its left end a controlling-arm $f^{76}$, rigidly secured thereto, which controls the movement of the lever $f^{74}$. The cord $f^{67}$ from the slide $f^{60}$ is connected to the lower end of a placing-lever $f^{77}$, having its hub loosely mounted on the left end of the shaft $f^{75}$ and provided with a controlling-arm $f^{78}$. These controlling-arms $f^{76}$ and $f^{78}$ overhang the path of the dummy proper in position to be intercepted, when released, in their downward movement, by the stops of the same. These two controlling-arms, together with certain other parts which will presently appear, overlie the tie-rod $f^{79}$ of a yoke-shaped cam-lever $f^{80}$, and when the dummy is in its normal or idle position are held in an uppermost or elevated position against the tension of the slide-springs $f^{64}$ and $f^{66}$ by a projection $f^{81}$ from the right arm of the yoke-lever $f^{80}$, which rests on a stop-lug $f^{82}$, fixed to the front plate of the dummy-frame. (For these parts see Figs. 19 and 20.) The yoke-shaped cam-lever $f^{80}$ is provided with a roller $f^{83}$ for action on a cam $f^{84}$, located directly below the same on the constantly-running power-shaft $b$. When the dummy is started into action, it moves toward the left, and its initial movement will throw the stop $f^{82}$ out from under the projection $f^{81}$ from the right arm of the yoke $f^{80}$, permitting the said yoke to fall and bring its roller $f^{83}$ into contact with the cam $f^{84}$. The controlling-arms $f^{76}$ and $f^{78}$, together with the placing-levers $f^{74}$ and $f^{77}$, will then be in their active position under the control of the slide-springs $f^{64}$ and $f^{66}$ and the cam $f^{84}$ on the power-shaft. The slide-springs tend to pull down the controlling-arms and throw the slides, together with the selecting-finger $f^{55}$, to an extreme position directly opposite and most remote from the finger's normal position. The cam $f^{84}$, when at its highest point, holds up the controlling-arms against the tension of the said springs and holds the selecting-finger in its normal position, as shown in Figs. 13, 14, and 15. At every turn of the cam the controlling-arms are permitted to lower, and if they were not intercepted would permit the selecting-finger to be thrown by the slide-springs to the opposite extreme position or left-hand corner of the diagram, (shown in Fig. 15;) but the controlling-arms will be variably intercepted by the dummy-stops $f'$, so as to position the selecting-finger on the said diagram at the point necessary for the alinement of the finger under the proper one of the die-operating rods $f^{41}$. At this time the striker-plate is raised by the cam $f^{51}$ and its connections, throwing up the selecting-finger into action on the die-operating rod, thus throwing the die-carrier with the selected die to the printing-point.

*The spacing or normal matrix-material-feed devices,* (see Figs. 7, 18, 19, 20, and 21.)— On the same idle-shaft $f^{75}$ which carries the controlling-arms $f^{76}$ and $f^{78}$ is loosely mounted a bell-crank spacing-lever $f^{85}$ $f^{86}$, of which $f^{85}$ represents the upper arm and $f^{86}$ the lower arm of the lever. The lower arm $f^{86}$ of this spacing-lever has connected thereto a spacing-hook $f^{87}$, which works through a slot in the dummy's runway in position to be variably intercepted by stop-surfaces on the lower ends of such of the dummy-stops $f'$ as are used for spacing. There is one of these spacing-stops in each set of three of the dummy-stops, as before stated. The rear vertical face of these facing-stops and the inner surface of the front plate of the dummy's frame, together with notches $f^{88}$ on the lower ends of the said spacing-stops, constitute the stop-surfaces to intercept the stop-hook $f^{87}$ in six different positions, so as to vary the spacing from two to seven units. It may be noted in this connection, as was stated in the general description, that the dies are all cut on the well-known units principle of self-spacing type, varying in the amount of space required for the impressions from two to seven units.

The upper arm $f^{85}$ overlies the tie-rod $f^{79}$ of the yoke $f^{80}$ and is held up thereby in the same manner as the controlling-arms $f^{76}$ and $f^{78}$ against the downward tension of a spring $f^{89}$, connected to the driving or feed pawl $f^{90}$. The driving-pawl $f^{90}$ is pivotally connected at its lower end to the said upper arm $f^{85}$ of the spacing-lever and has its free end in position for action on a ratchet feed-wheel $f^{91}$. When the dummy is in its idle or inactive position, the feed-pawl $f^{90}$ is normally held out of engagement with the ratchet $f^{91}$, against the strain of the spring $f^{89}$, by a trip-arm $f^{92}$ on the vertical trip-shaft $f^{12}$, which it will be recalled carries the clutch-shipper fork $f^{11}$. Hence when the clutch was closed, as hitherto described, to throw the dummy into action the trip-arm $f^{92}$ on the said shaft $f^{12}$ will be rocked toward the front, allowing the driving-pawl $f^{90}$ to be thrown inward by its spring $f^{89}$ into engagement with the said feed ratchet-wheel $f^{91}$. A gravity-held retaining-pawl $f^{93}$ coöperates with the said feed-pawl $f^{90}$ to hold the ratchet-wheel $f^{91}$ wherever it is set. The tail end of the retaining-pawl lies directly back of the trip-arm $f^{92}$, and hence both pawls will be tripped at the proper time after the dummy has completed its work and the clutch is opened by the backward movement of the said trip-arm $f^{92}$. The spacing-lever is subject to the action of the cam $f^{84}$ through the yoke-shaped cam-lever $f^{83}$ and the tie-rod $f^{79}$, these parts operating to lift the upper arm $f^{85}$ of the spacing-lever against the tension of the spring $f^{89}$ in the same way and at the same time as the controlling-arms $f^{76}$ and $f^{78}$ are raised. The spring $f^{89}$ throws down the arm $f^{85}$ of the spacing-lever when so permitted by the cam $f^{84}$, thus rocking the lower arm $f^{86}$ and the spacing-hook $f^{87}$ forward until intercepted by a stop-surface on the spacing member of the dummy-stop then in position. In other words, the spacing-hook $f^{87}$ will be variably intercepted by the spacing members of the dummy-stops to give the proper throw to the driving-pawl $f^{90}$, and the cam $f^{84}$ will positively lift the said driving-pawl at the proper time to effect the proper feed of the matrix material.

The feed-ratchet $f^{91}$ is mounted on a projecting bracket $f^{94}$ and carries on the left end of its shaft a pinion $f^{95}$, in engagement with a feed-rack $f^{96}$, suitably seated and extending to the front of the machine through passages in the upper ends of the central supports $a^2$ and other intermediate parts and terminating at its front end in an enlarged head-block $f^{97}$. (For these parts see Figs. 2, 7, and 21.) This feed-rack $f^{96}$ is indirectly connected with the matrix-material holder $f^{98}$ by a supplemental feed-rack $f^{99}$ and intermediate connections, which will be described in detail when describing later on the parts of the justifier. This supplemental feed-rack $f^{99}$ is normally held to the extreme front by weights and cord $f^{99\frac{1}{2}}$, against the strain of which its feed movements take place. It should be noted, however, that these intermediate connections are of such a character that if they remain unaffected by the other parts of the justifier the feed-ratchet $f^{91}$ and the feed-rack $f^{96}$ will have their normal effect only upon the matrix-material holder and will impart to the same the normal feed of the matrix material. In other words, the variable feed required to properly space the impression from the different dies, together with the normal feed of two units between words of the line, is effected directly from the ratchet-wheel $f^{91}$ and the feed-racks $f^{96}$ and $f^{99}$. The intermediate connections between the said racks above referred to are arranged so as to effect a supplemental feed between the words of the line, if necessary, so as to justify the line of impressions or matrix.

There are four of the matrix-material holders $f^{98}$, which are mounted for axial movement in suitable seats spaced apart from each other in a drum $f^{100}$. This drum is mounted to revolve on a cylindrical resistance bed or anvil $f^{101}$, which is rigidly secured between the upper ends of the central supports $a^2$. When the drum is standing still, which it does during the whole time that the dies are being impressed, one of the matrix-material holders is located directly above the impression point or axis of the impression-plunger and is in engagement with the rear end of the supplemental feed-rack $f^{99}$. The connection between this supplemental feed-rack and the holder is made by means of loose pins in the holder $f^{102}$, which engage with corresponding notches in the said rack. This connection permits the matrix-holder to be carried away from the rack when necessary, as will hereinafter appear. The pins also serve another function, which will be noted later on.

Directly behind the matrix-material holder when at the impression-point is a bell-mouthed guide channel $f^{103}$, (see Figs. 7, 21, and 43,) which forms a continuation of the holder's guide seat or channel in the matrix-holding drum when at the impression-point. Under its feed movements the matrix-material holder is fed backward into this channel $f^{103}$. The matrix-material holder has an initial movement into this channel before the matrix-making mechanism proper is started into action, the effect of which is to finally aline the drum and hold the same in its proper fixed position for insuring the accurate alinement of the matrix. It also locks the drum from turning and alines the other matrix-holders carried thereby in their respective required positions.

The matrix-holder has a recessed bed for the matrix material to permit the escape of the material displaced by the dies impressed, being in this respect exactly the same as the holder fully described and claimed in my former patent, No. 463,388. The matrix material $y$ is a strip of soft lead covered on its face with a surfacing of copper, described and claimed in my former patent, No. 478,333. The matrix-holder and strip of matrix material $y$ are shown in Figs. 22, 23, 24, and 25 of the drawings. The matrix-holders, in the machine herein shown, are provided with laterally-projecting spring-flanges $f^{104}$, which work in grooves in the vertical walls of the holder-seats on the drum and in the bell-mouthed guide-channel $f^{103}$, the purpose and effect of which flanges are to put the holder under a slight friction and hold the same tightly against the anvil.

It is evident that with the mechanism now described the matrix-material holder will be fed across the impression-point and that the dies will be thrown up at the proper time by the selecting-finger, under the control of the dummy when in action, over the reciprocating impression-plunger $f^{37}$. This plunger is connected at its lower end by a toggle-joint $f^{105}$ with a rock-shaft $f^{106}$, having a crank-arm $f^{107}$, connected by a link $f^{108}$ to a cam-lever $f^{109}$, which bears against a cam $f^{110}$ on the power-shaft $b$. The cam-lever is held against its cam and the toggle is broken by a spring $f^{111}$. The cam $f^{110}$ gives to the toggle $f^{105}$ sufficient throw to carry the same past the dead-center when the thrust is made, insuring the impression of the dies to a uniform depth and the retraction of the plunger, and the cam is also so shaped to hold the toggle at the extreme of its throw for an instant, thus giving time for the die-lever to be withdrawn from above the plunger and enabling the spring $f^{111}$ to readily return the toggle thereafter to its normal position.

Let it now be noted that the cam $f^{84}$, which controls the finger-placing and the matrix-material-feed mechanism, the cam $f^{51}$, which operates the striker-plate $f^{44}$, the cam $f^{110}$, which operates the plunger, and the cam-flange $f^4$, which effects the feed of the dummy, are all mounted on the constantly-running power-shaft $b$. The relative timing of these cams is as follows: The cam $f^{84}$ acts first to release the controlling-arms $f^{76}$ and $f^{78}$ and the upper arm $f^{85}$ of the spacing-lever, allowing the selecting-finger to be located and the feed-pawl for the matrix material to obtain its throw, as determined by the set of dummy-stops $f'$ then in position to intercept the said arms $f^{76}$ and $f^{78}$ and the spacing-hook $f^{87}$. The cam $f^{51}$ next acts to raise the striker-plate and the selecting-finger, throwing the die to the impression-point and holding the same there until the impression is made by the plunger under the action of the plunger-operating cam $f^{110}$. On a further movement of the cams the die-carriers, the impression-plunger, and the selecting-finger resume their normal positions, with the cam $f^{84}$ holding up the controlling-arms of the placing and spacing levers so as to clear the dummy-stops, and at the same time this upward movement of the cam $f^{84}$ effects a positive feed of the matrix-material holder by raising the feed-pawl $f^{90}$. Immediately thereafter the feed-cam flange $f^4$ moves the dummy one step toward the left, thereby bringing another set of its stops into position for action. These actions are repeated until all the sets of stops on the dummy which were positioned for use in the selected line have been brought into action, at which time the placing mechanism and the spacing mechanism will be automatically thrown out of action, rendering the matrix-making mechanism inoperative to produce any further impressions. This was done by the shoe $f^{24}$ moving backward under the action of its spring $f^{25}$ over the tops of the first unset stops of the dummy, allowing the trip-pawl $f^{21}$ to engage with the ratchet-teeth $f^{26}$ on the face of the dummy-frame, as before described, and be thereby moved to the left, thus bringing a stop-surface $f^{112}$, projecting from the top of the trip-pawl $f^{21}$, under the left arm of the yoke-shaped cam-lever $f^{80}$ and also bringing the left end of the said trip-pawl $f^{21}$ into contact with the free end of the latch $f^{19}$, thereby releasing the spring-held trip-shaft $f^{12}$ and opening the sliding clutch, as before described. It is possible for the stop-surface $f^{112}$ to pass under the left arm of the yoke-lever $f^{80}$ in virtue of the fact that the said yoke-lever is held up by the cam $f^{84}$ during the time that the forward feed movement of the dummy takes place. The stop-surface $f^{112}$ will remain in this position until the dummy has returned near to its final or normal position, at which time the stop $f^{82}$ will come under the right arm of the said yoke-lever in position to catch and hold up the same. The dummy has on its front plate an upwardly-projecting pin $f^{113}$, at a point near its left end, in position to engage a cam-surface on the back of the shoe $f^{24}$ on the return of the dummy, thereby throwing the shoe and the trip-pawl $f^{21}$ forward against the tension of the spring $f^{25}$ and at the same time drawing the shoe and its connected parts toward the right into their normal positions. By this movement of the trip-pawl and shoe the stop-surface $f^{112}$ will be drawn out from under the left arm of the cam-yoke $f^{80}$.

When the sliding clutch was tripped and opened on the movement of the trip-pawl $f^{21}$ toward the left, the trip-shaft $f^{12}$ was rocked toward the rear, throwing the trip-arm $f^{92}$ at its top into contact with the driving-pawl $f^{90}$ and the tail of the retaining-pawl $f^{93}$, rendering the same inoperative in respect to the ratchet-wheel $f^{91}$. When the ratchet-wheel $f^{91}$ is thus released, the feed-racks $f^{99}$ and $f^{96}$, together with the matrix-material holder, are returned to their normal position by the cord and weight $f^{99\frac{1}{2}}$. When the matrix-material holder is thus returned to its normal position, it is entirely within its seat on the drum $f^{100}$, so that the drum is free to be turned on the anvil-cylinder $f^{101}$. This movement of the drum occurs to the extent of a quarter-turn, so as to bring another holder with a new strip of matrix material to the impression-point at the time the duplicate dummy is raised for the next succeeding line. When the starting-key is struck and the dummy proper is thrown into action, the first step of its movement throws the stop-surface $f^{82}$ out from under the right arm of the yoke $f^{80}$, permitting the spacing-lever to become active, so as to effect an initial movement of the matrix-material holder into its guide-channel on the anvil-bracket to exactly aline the same, as before stated, and during this action of the spacing-lever the controlling-arms for spacing the selecting-finger are held up by stop-surfaces $f^{114}$ on the left end of the dummy-frame.

The matrix-making mechanism so far described would, under the control of the dummy, have produced an unjustified matrix. Instead of so doing, however, devices are provided to insure the production of a justified matrix, which devices will now be described.

*The justifier*, (see Figs. 1, 6, 7, 18, 21, and 26 to 29.)—It has already been stated that the matrix-material holder is connected indirectly to the feed-rack $f^{96}$. These indirect connections (see Figs. 7 to 21) are such as to permit of a supplemental feed to the matrix-material holder and comprise a loose rack $g$, mounted for vertical movement in the head $f^{97}$ of the feed-rack $f^{96}$, an antifriction-roller $g'$ on the rack $g$, a pivoted head-block $g^2$ directly under the said roller, a vertically-movable justifier feed-bar $g^3$, supporting said head-block, a segmental gear $g^4$ on an idle-shaft $g^5$, mounted in the rack-head $f^{97}$ and in engagement with the said vertical rack $g$, and a pinion $g^6$ on the right end of the shaft $g^5$ in engagement with the supplemental feed-rack $f^{99}$. The justifier feed-bar $g^3$ is normally held in an uppermost position by means which will be presently described. Inasmuch as the supplemental feed-rack $f^{99}$ is under strain from the weight $f^{99\frac{1}{2}}$, to move toward the front or backward with reference to the direction of its feed, it will hold the vertical or loose rack $g$ under downward strain, with the roller $g'$ resting against the block $g^2$, and if the justifier feed-bar $g^3$ be lowered it will draw the supplemental feed-bar $f^{99}$ backward, subtracting from the normal feed. On the other hand, if the justifier feed-bar be raised it will lift up the loose rack $g$ and through the segmental gear $g^4$ and the pinion $g^6$ will move the supplemental feed-rack $f^{99}$ forward, imparting an additional feed to the matrix-material holder. It is obvious, therefore, that either plus or minus justification may be effected by simply raising or lowering the justifier feed-bar $g^3$. This might, for example, be done by hand. Instead of so doing, however, devices are provided, which for convenience of reference may be called a "controller," which will automatically raise or lower the said justifier feed-bar $g^3$ at the times when the word-spacing movements of the matrix-material-feed rack $f^{96}$ occur, so as to either add to or subtract from the normal feed movement of the matrix-material holder, thereby varying the same, as may be required to justify the line, if such variations be necessary. In case the line of dies or characters, as originally selected from the keyboard, be exactly full, the controller for the said justifier feed-bar $g^3$ will be so set as to produce no vertical motion of the said bar, and hence no variation of the normal feed will be made; but if the line, as selected on the keyboard, was less than full or more than full then the said controller for the said justifier feed-bar will be so set as to vary the word-space movements of the matrix-material holder, either by way of addition or subtraction and to the extent that may be necessary to effect the justification. The variation, whatever it may be, is proportionately distributed among all the word-spaces of the line. The controller for the said feed-bar $g^3$ is indirectly set from the letter-space indicator-rack $d^{77}$ to determine the quantity or total amount of the variation for the entire line and from the space-bar $d^{83}$ of the keyboard to determine the division or distribution of the said variation equally among all the word-spaces of the selected line. It will be recalled that the said indicator-rack $d^{77}$ and the said space-bar $d^{83}$ constituted a part and were described with "the primary setting devices," and that it was therein stated that these parts had connections to the justifier, which resulted in properly setting the active members of the same when the duplicate dummy was raised to transfer its settings to the dummy proper. These connections from the said indicator-rack $d^{77}$ and from the said space-bar $d^{83}$ to the said active parts of the justifier will now be traced. In other words, the construction of the said controller for the supplemental feed of the matrix material and the means for setting the same will now be described, reference being had to Figs. 1, 2, 6, 7, 18, and 21 and the details shown in Figs. 26 and 29, inclusive.

Located in a groove of the head $d^{78}$, projecting from the right end of the duplicate-dummy's frame $d^{52}$, (see Fig. 6,) is an idle-rack $g^7$, in position to be struck by a stud $g^8$ on the lower end of the indicator-rack $d^{77}$ and be carried upward therewith if necessary. The idle-rack $g^7$ is in engagement with a pinion $g^9$, fixed to the rear end of a shaft $g^{10}$, (see Fig. 6,) which extends to the front of the machine above the bed-plate and is provided at its forward end with another pinion $g^{11}$, in engagement with a front rack $g^{12}$, extending lengthwise of the bed-plate toward the left. (See Figs. 1, 2, and 6.) This front rack $g^{12}$ works in a seat formed in the front plate of a casing or box $g^{13}$, which incloses some of the other parts of the justifier. The rack $g^{12}$ is held under tension by a spring $g^{14}$ to move toward the left and is provided with rack-teeth under its left end portion in engagement with a pinion $g^{15}$ on a backwardly-extended shaft $g^{16}$. (See Figs. 1 and 18.) The shaft $g^{16}$ passes inward to the interior of the box $g^{13}$ through the hollow front trunnion of a pivoted frame $g^{17}$, (see Fig. 27,) and carries on its inner end a pinion $g^{18}$, in engagement with a rack $g^{19}$, which is mounted for lengthwise movement within the said pivoted or tilting frame $g^{17}$. The rack $g^{19}$ has formed integral therewith a triangular or prism-shaped block $g^{20}$, located directly under an extended part or foot portion of the vertically-movable justifier feed-bar $g^3$. The foot-piece or lower portion of the feed-bar $g^3$ when in its normal position stands approximately parallel with the line of movement of the block $g^{20}$ to prevent any motion being imparted to the said feed-bar $g^3$ when the said block $g^{20}$ is being set. This pivoted or tilting frame $g^{17}$, together with the shiftable bearing-block $g^{20}$, constitutes the essential parts of the controller for determining the quantity of variation, if any, which is to be transmitted to the feed-bar $g^3$ and through the same to the supplemental feed for the matrix-material holder. The power end of this pivoted frame or lever $g^{17}$ moves a constant distance for all lines between fixed limits, and the shifting block $g^{20}$ is simply a means of varying the throw or stroke in extent and direction which the said lever imparts, at the point of its action, on its weight—to wit, on the feed-bar $g^3$ for any line. As shown, the block is shifted, with reference to the pivot of the lever, toward and from the pivotal center and to opposite sides of the same; but it will be understood that other constructions might be provided which would accomplish the same result. The point to be observed is that the throw on the bar $g^3$, however imparted, must be variable in extent and in direction with respect to the movement of the power end of the lever.

Referring now to Fig. 26, it is obvious that if the block $g^{20}$ be in the position shown (to the left of the pivoted center of the frame $g^{17}$) then when the said frame is rocked so that its right end will move downward the block $g^{20}$ will impart an upward motion to the feed-bar $g^3$, causing an additional feed of the matrix-material holder. If the block $g^{20}$ had been directly at the pivotal center of the said frame, no motion would be imparted to the feed-bar $g^3$ when the said frame was rocked. Hence no variation would be produced. If the said block had been to the right of the pivotal center of the said frame, then when the frame was rocked so that its right end moved downward the said block would also be lowered, allowing the feed-bar $g^3$ to descend, subtracting from the normal feed of the matrix-material holder. By the front rack $g^{12}$ and its connections, as previously designated, to the idle-rack $g^7$, which is operated, if necessary, by the indicator-rack $d^{77}$, when the duplicate dummy is raised, the said block $g^{20}$ will be set with reference to the pivotal center of the said tilting frame $g^{17}$, as may be required to effect the proper justification. In other words, if no variation in the normal feed is required to justify the line the said block will stand at the pivotal center of the said frame. If a variation in the matrix-material feed is required by way of addition, the said block will be located to the left of the said pivotal center, and if the variation is required by way of subtraction the said block will stand to the right of the said pivotal center.

The indicator-rack $d^{77}$, with its stud $g^8$ and adjacent idle-rack $g^7$ for setting the block $g^{20}$, may be arranged for any desired margin of possible variation in the matrix feed for effecting justification. All that is necessary to note is the fact that the relation between these two racks must always be such that if the characters and normal spaces between words, as indicated on the keyboard, would exactly fill out the column line then the said block $g^{20}$ must be thrown by the said racks and their connections to the pivotal center of the said tilting frame $g^{17}$.

The indicator-rack $d^{77}$ is set from the keyboard and the setting-carriage on the selection of the characters in a relative position with reference to the idle-rack $g^7$, and when the duplicate dummy is raised it carries the indicator-rack with it and moves the idle-rack $g^7$ so as to set the said block $g^{20}$ by the connections described in the required position with reference to the said pivotal center of the said tilting frame $g^{17}$.

The parts so far described will set the justifier so as to give the requisite quantity of variation, if necessary, to the matrix-material feed. If the tilting frame $g^{17}$ was moved downward by a single step, this variation would all be effected at once, but instead of so doing devices are provided to rock the said tilting frame by a succession of steps variable in number, according to the number of spaces between the words of a selected line. This division is effected by a variable escapement which is set from a word-space rack or register on the raising of the duplicate-dummy's frame, the parts of which word-register are set directly from the space-bar on the keyboard by connections which will now be described.

The space-bar $d^{83}$ has a backwardly-extended arm $g^{21}$, projecting through a case $g^{22}$ and underlying a spring-retracted toggle-pawl $g^{23}$, pivoted within the said case. This toggle-pawl $g^{23}$ (see Figs. 18 and 27) is in position to engage the under teeth of a word-space rack $g^{24}$ and move the same toward the right against the tension of a spring $g^{25}$. Hence every time the space-bar is struck at the keyboard this word-space rack $g^{24}$ will be moved toward the right one step and be held by a gravity-acting retaining-pawl $g^{26}$, engaging teeth on the top surface of the said rack. This pawl $g^{26}$ is pivoted to and carried by a crank-arm $g^{27}$ on an idle-shaft $g^{28}$. This idle-shaft extends toward the rear of the machine under the bed-plate and is provided at or near its rear end with another crank-arm $g^{29}$, (see Fig. 6,) the free end of which is connected by a link $g^{30}$ to the duplicate-dummy's frame. So long as the dummy-frame remains in its lowermost or normal position the pawl $g^{26}$ simply acts as a retaining-pawl on the word-space rack $g^{24}$, but when the duplicate dummy is raised a further and final movement will be imparted thereby through the shaft $g^{28}$ and the pawl $g^{26}$ to the word-space rack $g^{24}$.

A slide-bar $g^{31}$ underlies the left end of the word-space rack $g^{24}$ and carries a yoke $g^{32}$, embracing the free ends of a pair of escapement-pawls $g^{33}$. (See Figs. 18, 27, and 28.) When the word-space rack $g^{24}$ is moved to the right into its final position, it engages and carries with it the slide-bar $g^{31}$ and the free ends of the escapement-pawls $g^{33}$ and sets the same in proper position for action on the proper member of a series of escapement-racks $g^{34}$, cut on the back surface of a vertically-movable block $g^{35}$, which has cut on its left face a rack $g^{36}$ in engagement with a sector $g^{37}$ on the right end of the tilting frame $g^{17}$. The escapement-racks $g^{34}$ on the back of the block $g^{35}$ vary in number of teeth from three to ten, so as to give corresponding escapement movements and provide for the variation in the spacing between the words of lines varying from four to eleven words. The free ends of the escapement-pawls $g^{33}$ will be set in position for action on that member of the said escapement-racks $g^{34}$ which has a number of teeth corresponding to the number of spaces between the words of the selected line.

The tilting frame $g^{17}$ has attached to its left end a weight $g^{38}$, which normally holds the sector $g^{37}$ and the block $g^{35}$ in their uppermost positions, as shown in Figs. 26 and 27. A vertically-movable rack-plunger $g^{39}$ is mounted within the justifier-box $g^{13}$ and is normally held in its lowermost position by a pinion $g^{40}$ on a shaft $g^{41}$, which is under tension from a coiled spring $g^{42}$. The block $g^{35}$ carries at its lower end a spring-pawl $g^{43}$, the free end of which normally bears against the side of the rack-plunger $g^{39}$ in position to snap under the lower end of the same when the said plunger is raised. This plunger is raised on the upward movement of the duplicate dummy against the strain of the spring $g^{42}$ by a pawl $g^{44}$ on a crank-arm $g^{45}$, secured to the front end of the shaft $g^{28}$. At the extreme of the crank-arm's upward throw the spring-pawl $g^{43}$ on the block $g^{35}$ snaps under the plunger and the pawl $g^{44}$ strikes a cam-surface $g^{46}$ and is thereby thrown out from under the plunger. The strain of the spring $g^{42}$ is thus thrown onto the block $g^{35}$, rendering the escapement-racks $g^{34}$ active. At the initial movement downward of the block $g^{35}$ the escapement-racks are thrown down against the free ends of the escapement-pawls $g^{33}$ and are upheld thereby. The parts are so shown in Fig. 28. On this initial downward movement of the block $g^{35}$ a gravity-latch $g^{47}$, normally held up by the tilting frame $g^{17}$, falls into engagement with teeth cut on the top surface of the front rack $g^{12}$, (see Figs. 1 and 18,) thereby securing the said front rack from return movement with the duplicate dummy and indicator-rack and retaining the same together with the parts set thereby in their set position during the process of justification. The slide $g^{31}$, which was moved to the right by the word-space rack $g^{24}$, was moved against the tension of a spring $g^{48}$ and was held wherever set by a retaining-pawl $g^{49}$, projecting backward under spring tension from a seat in the right plate of the box $g^{13}$ and engaging with ratchet-teeth $g^{50}$, cut on the front face of the said slide $g^{31}$. (See Fig. 18.) Hence the free ends of the escapement-pawls $g^{33}$ are held wherever set, so as to stand under the proper member of the escapement-racks $g^{34}$. When these escapement-pawls were at the extreme left or in their normal position, they were out of the path of any of the racks $g^{34}$; but when set as described and the plunger is lifted to render the spring $g^{42}$ active on the block $g^{35}$ the free ends of the escapement-pawls stand under that particular member of the said escapement-racks $g^{34}$ which has a number of teeth corresponding to the number of spaces in the selected line. For example, if the selected line has nine words, or eight spaces between words, the escapement-pawls when set would be directly under the lower notch of the rack having eight teeth and would be holding the escapement-rack $g^{34}$ and block $g^{35}$ up against the strain of the spring $g^{42}$. Hence every time that the escapement-pawls $d^{33}$ are operated the block $g^{35}$ will be permitted to lower one step, thus rocking the tilting frame $g^{17}$ through the rack $g^{36}$ and the sector $g^{37}$ and producing a corresponding movement on the justifier feed-bar $g^{3}$, and through the same varying the feed movement of the matrix-material holder. In other words, the variable-escapement racks $g^{34}$ and the escapement-pawls $g^{33}$ coöperate to effect the division of the downward movement of the tilting frame or lever $g^{17}$ at its power or sector end, thereby subdividing the amount of throw from the block $g^{20}$ onto the feed-bar $g^{3}$ into as many steps as there are word-spaces in the line.

The operation of the escapement-pawls $g^{33}$ to release the block $g^{35}$ and effect the supplemental feed occurs between words and is effected by the following means: The escapement-pawls $g^{33}$ lie side by side at their free or active ends and slide lengthwise in their escapement action. They are held by the yoke $g^{31}$ from lateral movement, and the left member is under tension from a spring $g^{51}$ to move upward and is limited by the yoke $g^{31}$. The rear ends of these escapement-pawls diverge and are pivoted to the opposite ends of a rocker $g^{52}$, which is pivoted to rock in the vertical plane and provided with a crank-arm $g^{53}$, which is connected by a link $g^{54}$ with a pivoted spring-pressed releasing-lever $g^{55}$, overhanging the terminal plate $g^{42}$ and having a releasing-pin $g^{56}$ depending within a central hole of the said terminal plate. (See Figs. 13 and 28.) Every time that any one of the word-spacing members of the dummy-stops $f'$ is brought into action under the movement of the dummy the selecting-finger $f^{55}$ is thrown under the hole containing the releasing-pin $g^{56}$ and is made to act on the same by the striker-plate, thus actuating the escapement-pawls $g^{33}$ and permitting the block $g^{35}$ to escape and lower one step. The escapement action of the pawls $g^{33}$ is effected by the sliding action from the rocker in combination with the slight vertical motion given the left member of the pawls by the spring $g^{51}$. In this way the block $g^{35}$ escapes every time that the normal word-space feed movement of the matrix-material holder takes place from the driving-pawl $f^{90}$ and ratchet-wheel $f^{91}$, permitting the justifier to act through the justifier feed-bar $g^3$, under the escapement movements of the block $g^{35}$, to vary the normal feed, if necessary, as may be required to produce a justified matrix. By this justifier, as described, this variation all takes place, if any is made, between the words of the line and is evenly divided among all of the spaces between the said words. This justification may either be by way of addition to the normal feed or by way of subtraction therefrom, according to the necessity of the case, the only difference in the mechanism for the purpose being in the location of the bearing-block $g^{20}$ with respect to the pivotal center of the pivoted lever or tilting frame $g^{17}$, as hitherto stated.

The parts of the justifier are returned to their normal positions as follows: When the dummy proper engages the trip-pawl lever and releases the sliding clutch, permitting the same to open under the action of its retracting-spring, the vertical trip-shaft $f^{12}$ is rocked, as hitherto described, toward the rear of the machine. The lower crank-arm $f^{13}$ on this trip-shaft $f^{12}$ has attached thereto a releasing-rod $g^{57}$ under the bed-plate, which extends forward through a keeper $g^{58}$, with its free end in position to strike the tail end of the spring-pawl $g^{43}$ and trip the same out when the said shaft is rocked at the opening of the sliding clutch from under the plunger $g^{39}$, thus permitting the said plunger to be lowered by the spring $g^{42}$ into its normal position and allowing the weight $g^{38}$ to return the block $g^{35}$ into its uppermost or normal position.

The retaining-pawl $g^{49}$ for the slide $g^{31}$ has a stud $g^{59}$, which projects through a slot $g^{60}$ of the plunger $g^{39}$, which is cam-shaped at its upper end and acts at the lower limit of the plunger's downward movement and before the pawl $g^{43}$ is tripped from under the plunger to withdraw the retaining-pawl $g^{49}$, thus permitting the slide $g^{31}$ and the free end of the escapement-pawls, carried thereby, to be returned to the extreme left into their normal positions by the tension of the spring $g^{48}$ after the last escapement and before the dummy reaches the end of the last word of the line, thus getting the pawls out of the way of the escapement-racks $g^{34}$ and the block $g^{35}$ before the release of the same. On the return of the tilting frame $g^{17}$ its upper end strikes an inwardly-projecting stud $g^{61}$ on the latch $g^{47}$, lifting the same up and releasing the front rack $g^{12}$. This permits the said front rack $g^{12}$ to be returned into its normal position by its retracting-spring $g^{14}$, thereby returning all its connected parts, including the rack $g^7$, working near the indicator-rack, to their normal positions.

The word-space rack $g^{24}$ was released from its retaining-pawl $g^{26}$ at the extreme of the throw given the same through the shaft $f^{28}$ on the upward movement of the duplicate dummy. This release was effected by the front end of the pawl $g^{26}$ coming in contact with a releasing-stud $g^{62}$. The word-space rack $g^{24}$ was thereupon immediately returned to the extreme left into its normal position by its retracting-spring $g^{25}$. This release of the word-space rack $g^{24}$ by the movement of the duplicate-dummy frame was necessary in order to permit the same to be in use under the control of the space-bar of the keyboard for the next line. In other words, it acts like the indicator-rack to set the escapement of the justifier proper when the duplicate dummy is raised and then immediately returns into its normal position, like the indicator-rack, ready for use on the next line, while the justifier proper is effecting the justification of the previous line.

With the matrix-making mechanism now described a justified matrix will have been produced in the matrix material on the holder then at the impression-point, and all the parts of the same will have been returned, as described, to their normal positions ready for use on another line when the starting-key is again touched. Other parts of the matrix-making mechanism, however, remain to be specified, which coöperate toward the continuous operation and with the casting mechanism.

The block $g^2$, carried by the justifier feed-bar $g^3$ at its upper end and sustaining the antifriction-roller $g'$ on the loose rack $g$ against the strain of the weight $f^{99\frac{1}{2}}$ throughout the feed of the matrix-material holder, is pivotally connected to a projecting arm of the said justifier feed-bar at its forward end and is supported at its free end by a set-screw $g^{63}$. This permits the said block to be adjusted at its free end and to be set either parallel with the supplemental feed-rack $f^{99}$ or at any desired angle thereto, inclining either backward or forward with reference to the line of travel of the matrix-material holder and the antifriction-roller $g'$ on the loose rack $g$. If the said block $g^2$ be set so that it stands parallel with the supplemental feed-rack $f^{99}$, no variation will be produced thereby on the matrix feed. If it be set at an angle inclining on a downward slope with reference to the travel of the roller $g'$, then every time that the matrix-material holder is fed forward one step the roller $g'$ will lower slightly proportional to the amount of feed and reduce the same correspondingly from its normal amount. On the other hand, if the free end of the block $g^2$ be raised, so that the roller $g'$ must travel on an upward incline, then every time that the matrix-holder is fed forward the roller $g'$ and loose rack $g$ will be slightly raised in proportion to the amount of the feed and through the segment-gear $g^4$ and the pinion $g^6$ will increase correspondingly the amount of the feed. This feature of construction serves two purposes, to wit: It provides a means of compensation for any inaccuracy in the proportions or adjustments of the feed connections to the matrix-material holder, so as to secure the exact desired feed, and, second, it provides a means of varying the normal units of feed on the matrix-material holder, so as to adapt the feed movements to the units of measurement on which the type-faces are cut.

The faces of the type "runningwise" are all multiples of a common arbitrary unit—such, for example, as one-ninth, one-tenth, one-eleventh, or one-twelfth of pica. The type-dies in this machine are cut one-tenth of pica, and the normal feed of the matrix-material holder is set to the same unit—viz., one-tenth of pica. In case it is desired to use type cut on a larger unit—as, for example, one-ninth of pica—the block $g^2$ may be thrown up to correspondingly vary the unit of feed; and if it is desired to use type cut on a smaller unit—as, for example, one-twelfth of pica—the block may be lowered so as to correspondingly decrease the feed. In other words, by means of the block $g^2$ the matrix-material feed may be conformed to any desired unit.

*Device for filling the matrix-strips into their holders,* (see Figs. 1, 2, and 30.)—As before stated, there are four of the matrix-material holders, and when one of the same is at the impression-point another is in line with the mold holding the matrix of the previously-made line, a third is at the ejecting-point for throwing out the old or used matrix from which the cast of the second preceding line was made, and the fourth or empty holder is in line with an automatic filling device, by which the blank strips are supplied and forced one at a time into the matrix-holder. The old or used matrix is ejected when the holder is at the top of the drum by the loose pins $f^{102}$ in the holder in coöperation with annular cam-grooves $f^{115}$ in the anvil $f^{101}$, within which the said pins travel when the drum $f^{100}$ is revolved. The cam-grooves run out flush with the surface of the anvil at some point intermediate the mold and the automatic filling device, and by raising the loose pins force the old or used matrix off from the holder into a guide-chute $f^{116}$, (see Fig. 2,) which carries the same out of the way. The empty holder for receiving the new strip or blank of matrix material stands as shown in Fig. 30. Referring now to this figure, the blank strips $y$ are held in a magazine $f^{116}$ under strain from a weight $f^{117}$ and a follower $f^{118}$ to move toward the matrix-drum. The end strip next to the drum is forced down at the proper time by a blade $f^{119}$ on a pair of pivoted arms $f^{120}$, having a common pivot-shaft $f^{121}$. The shaft $f^{121}$ (see Fig. 1) has a crank-arm $f^{122}$, provided with a link $f^{123}$, having a latch-notch at its free end, which engages a lug $f^{124}$ on a plunger-bar $f^{125}$, working in a suitable seat directly below the magazine proper and working on the upper face of a bracket $f^{126}$, which supports all these parts. When the end strip of matrix material is forced down by the blade $f^{119}$, it stands edgewise, directly in front of the horizontally-movable plunger-bar $f^{125}$. This plunger-bar is connected by links $f^{127}$ to a pair of crank-arms $f^{128}$ on a shaft $f^{129}$, which extends through a seat in the anvil $f^{101}$, and extends to the rear through the top of the rear central support $a^2$, and is provided with a crank-arm $f^{130}$. (See Figs. 7 and 12.) An eccentric-rod $f^{131}$ has at its upper or free end a notch and pin connected with the crank-arm $f^{130}$, as shown at $f^{132}$, and the strap portion of the same at its lower end works on an eccentric $f^{133}$ on the auxiliary movement-shaft $c$. The eccentric-rod $f^{131}$ is normally held in engagement with the pin on the crank-arm $f^{130}$ by a spring $f^{134}$. The notch-and-pin connection $f^{132}$ permits the eccentric-rod to be thrown back out of engagement with the crank-arm $f^{130}$, in case this should be required, for a purpose which will presently appear. Through the connections described the eccentric $f^{133}$ on the auxiliary movement-shaft imparts to the plunger $f^{125}$ a complete throw forward and backward during the revolution of the auxiliary movement-shaft, thereby forcing a strip of matrix material into the empty holder on its forward throw toward the drum and through the link $f^{123}$ raises the blade $f^{119}$, permitting the weight $f^{117}$ and follower $f^{118}$ to throw another strip forward under the said blade. On the backward movement of the plunger into its normal position the link $f^{123}$ is moved in the opposite direction, thereby throwing down the feed-blade $f^{119}$ and forcing the strip thereunder into its position in front of the filling-plunger $f^{125}$, ready for the next holder.

The drum which carries the matrix-holders is given a quarter-turn during the first sixty-degrees movement of the auxiliary movement-shaft $c$ to aline its respective holders in their proper respective positions by connections from a pair of cams on the auxiliary movement-shaft, which are also used to locate the mold as part of the casting mechanism. These connections will be specified under that head.

*The casting mechanism,* (see Figs. 1, 2, 3, and 30 to 39.)—The mold $h$ is mounted to move from front to rear and return in a suitable runway formed by upper and lower guide rails or plates $h'$ $h^2$. Normally the mold stands in its ejecting position at the front of the machine. The mold is carried by a rack $h^3$, the engagement between the said rack and mold being effected by pins $h^4$ on the rack, which work in cam-shaped slots $h^5$ (see Fig. 34) on the lower surface of the mold. The rack $h^3$ works in a suitable seat on the lower plate $h^2$ of the mold's runway, and the mold is provided on its upper surface with a flange $h^6$, which works in a groove $h^7$, cut in the under surface of the top plate $h'$ of the runway. The groove $h^7$ is enlarged at the casting position of the mold, by means of which and the cam-slot and pin connection between the mold and the rack a slight lateral motion can be given to the mold, for a purpose which will later appear.

The mold-driving rack $h^3$ engages a gear $h^8$ on a shaft $h^9$, which is seated in the plate $h^2$ and has on its right-hand end a pinion $h^{10}$, which engages with a vertical rack $h^{11}$. The rack $h^{11}$ is seated at its upper end in an extended flange-like bracket $a^7$, formed integral with the front member of the central supports $a^2$ and extends downward with its free end working through a guide-slot in the bed-plate. The rack $h^{11}$ is connected by a link $h^{12}$ with the forward arm of a cam-lever $h^{13}$, which carries a pair of rollers $h^{14}$ and $h^{15}$, standing in different planes and working against the faces of a corresponding pair of cams $h^{16}$ and $h^{17}$ on the auxiliary movement-shaft, near the forward end of the same. The cam $h^{16}$, working on the roller $h^{14}$, raises the rack $h^{11}$ to throw the mold toward the rear of its runway into its casting position on the initial movement of the auxiliary movement-shaft, and the cam $h^{17}$, working on the roller $h^{15}$, lowers the rack $h^{11}$ after the cast has been taken, thereby throwing the mold forward again into its normal or ejecting position.

The rack $h^{18}$ is mounted for vertical movement in a suitable seat at the upper end of the flange-bracket $a^7$ and carries at its lower end a pivoted spring-held pawl $h^{19}$, the lower end of which is normally held in engagement with a notch on the right face of the vertical rack $h^{11}$. The rack $h^{18}$ is therefore normally held to move with the rack $h^{11}$. The rack $h^{18}$ engages at its upper end a pinion $h^{20}$ on a shaft $h^{21}$, extending toward the rear through the bracket-flange $a^7$ and having at its rear end within a slot on the shaft a pivoted spring-pawl $h^{22}$. (See Fig. 2.) This pawl $h^{22}$ normally engages ratchet-teeth on the rear face of a pinion $h^{23}$, which is loosely mounted on the shaft $h^{21}$. Hence when the shaft turns in one direction the said pawl will turn the loose pinion, and when the shaft turns in the other direction the pawl will slip over the ratchet-tooth on the pinion. The pinion $h^{23}$ engages gear-teeth $h^{24}$, cut on the periphery of the drum $f^{100}$ at its front margin, and serves to turn the said drum at the proper times. When the vertical rack $h^{11}$ is lifted, the rack $h^{18}$ and its connections just described to the pinion $h^{23}$ will turn the bottom of the drum from right to left in the direction of the arrow and give to the same a quarter-turn at the same time that the mold was thrown to the rear by the said rack $h^{11}$ into its casting position. This quarter-turn brings the holder with the last-made matrix in line with the mold and the holder with a new strip of matrix material to the impression-point and the other two holders into their proper respective positions, as before stated. On the downward movement of the vertical rack $h^{11}$, which returns the mold after the cast has been taken to its normal or ejecting position, the pawl $h^{22}$ slips over the ratchet-tooth on the face of the pinion $h^{23}$, thus permitting the matrix-drum $f^{100}$ to remain stationary. The drum will be held from any reverse motion under the friction of the pawl $h^2$ on the pinion $h^{23}$ by a retaining-pawl $h^{25}$. At this time the fact that the particular matrix-holder which is then at the impression-point will have been thrown into its guide-channel $f^{103}$ by the initial movement of the dummy will constitute a lock to the said drum, except in a single instance, of a final cast at the end of an article, for example, taken after the operator stops at the keyboard.

In case for any reason it is desired to take a second or third cast from any given matrix the mold may be moved independently of the drum, while the drum is held stationary by disconnecting the racks $h^{18}$ and $h^{11}$ and throwing off the eccentric-rod $f^{131}$ from the crank $f^{130}$ to render the filling device inoperative. Both of these disconnections are effected at the same time by a hand trip-lever $h^{26}$ on a shaft $h^{27}$. The shaft $h^{27}$ is seated in the anvil $f^{101}$ and has at its rear end a trip-arm $h^{28}$ for disconnecting the eccentric-rod, and the hand-lever $h^{26}$ has a trip-finger $h^{29}$ for striking the tail end of the pawl $h^{19}$ and disconnecting the racks $h^{18}$ and $h^{11}$.

When the mold is at the rear end of its runway at the casting position, it will stand directly in front of a slot $h^{30}$ in the double-wall housing $h^{31}$, which incloses the casting-pot $h^{32}$ and the burner $h^{33}$. The casting-pot contains type-metal kept in a molten condition by the burner.

The casting-pot is carried on a pair of parallel arms $h^{34}$, located at the rear and front ends of the same. All four of the said arms are pivotally connected to the casting-pot at their upper ends. The right pair are pivoted at their lower ends to lugs projecting from a horizontal bracket $a^8$, which extends toward the left from the central support $a^2$. The left pair of arms $h^{34}$ are loosely pivoted at their lower ends to an idle-shaft $h^{35}$ and are held to rock with the said shaft by flanged clamp-arms $h^{36}$, rigidly secured to the said shaft, and set-screws $h^{37}$ and $h^{38}$. Of these set-screws $h^{37}$ is seated in the arms $h^{34}$ and works between the flanges of the clamp-arms $h^{36}$, and the latter, $h^{38}$, works in the left flange of the said clamp-arms and acts as a jam-screw to hold $h^{37}$ wherever it may be set. This special construction permits the throw or movement of the casting-pot to be adjusted with reference to the throw of the rock-shaft $h$.

The rock-shaft $h$ has rigidly attached thereto a two-pronged cam-lever $h^{39}$, having a pair of rollers $h^{40}$ and $h^{41}$, which work on a common cam $h^{42}$, secured to the auxiliary movement-shaft $c$ at a point near the center of the same. The cam $h^{42}$ acts, at the proper time, through the roller $h^{40}$ and the connections therefrom, to throw the casting-pot toward the right into its casting position, with the nozzle of the same projecting through the slot $h^{30}$ and against the back of the mold. This movement forces the mold tightly against the matrix-material holder and the parts are then in position to permit the cast to be taken. The casting-pot contains a pump $h^{43}\,h^{44}$. The plunger $h^{44}$ of this pump is attached at its upper end to a pivoted lever $h^{45}$, the free end of which is connected by a rod $h^{46}$ with the free end of a cam-lever $h^{47}$ under strain from a weight $h^{48}$ and normally held up, so that the pump is inactive, by a cam $h^{49}$ on the auxiliary movement-shaft $c$. This cam is so timed with reference to the cam $h^{42}$, which locates the casting-pot in the casting position, that it acts to release the pump-plunger, allowing the weight $h^{48}$ to throw down the pump-plunger and make the cast by an instantaneous action and again raise the same, while the casting-cam $h^{42}$ holds the casting-pot and the mold tightly against the matrix-material holder. Immediately after the cast has been taken and the pump-plunger has again been raised by the cam $h^{49}$ the cam $h^{42}$ acts on the right roller $h^{41}$ of the cam-lever $h^{39}$ and returns the casting-pot to the left into its normal position. Immediately thereafter the rack-controlling cam $h^{17}$ acts on the roller $h^{15}$ of the cam-lever $h^{13}$ and, through its connections, lowers the rack $h^{11}$ and throws the mold forward to the front of its runway into its normal or ejecting position. In this return movement of the mold the back of this slug or linotype is shaved by a planing-knife $h^{50}$.

When the mold is struck by the nozzle of the casting-pot, it is permitted to move laterally of its runway toward the right, so as to be clamped by the casting-pot tightly against the matrix-material holder in virtue of the cam-slots $h^{5}$ in the bottom of the mold and the laterally-enlarged part of the flange-groove $h^{7}$ in the upper plate of the mold's runway. The mold has, on its right face, spring-seated pins $h^{51}$, (see Figs. 35 and 36,) which when the mold is forced against the matrix-holder yield against their springs, and when the casting-pot is thrown toward the left away from the mold react against the matrix-strip, thereby preventing the strip from following the mold and linotype. The positive withdrawal of the mold toward the left away from the matrix-material holder and before any forward or return movement lengthwise of its runway is given to the same is insured by the cam-slots $h^{5}$, within which work the pins $h^{4}$ on the rack, and the relation of the top flange $h^{6}$ on the mold to its groove $h^{7}$ in the top rail of the mold's runway. This flange $h^{6}$ engages behind a shoulder formed by the enlargement in the groove $h^{7}$, so that under the action of the cam-slots $h^{5}$ and the pins $h^{4}$ the mold must move directly backward at the initial pull on the rack $h^{3}$.

The cast linotype is ejected from the mold by a blade $h^{52}$ on an ejecting-rack $h^{53}$, seated in a bracket $a^{9}$, projecting toward the left from the lower plate and the mold-runway. This rack $h^{53}$ engages a sector on a bell-crank lever $h^{54}$, the other arm of which is connected by a link $h^{55}$ with a cam-lever $h^{56}$, the free end of which bears against an ejecting-cam $h^{57}$ on the auxiliary movement-shaft. This cam is operated to move the ejecting-blade toward the right at the latter part of the auxiliary shaft's movement against the strain of a retracting-spring $h^{58}$, thereby moving the said blade against the back of the cast slug or linotype and forcing the same out from the mold onto a pivoted receiving-tablet $h^{59}$. The ejecting-cam having done its work, the ejecting-blade $h^{52}$ would be thrown back toward the left into its normal position by the retracting-spring $h^{58}$. (For these parts see Figs. 1 and 38.)

The receiving-tablet $h^{59}$ is pivoted to a head-block $h^{60}$, carried on the upper end of a rod $h^{61}$, which is mounted for vertical movement through a keeper $h^{62}$ at its upper end and a guide-hole in the bed-plate at its lower end. The head-block has a finger $h^{63}$, the upper end of which forms a rest for the free end of the tablet $h^{59}$, so that the same stands in a horizontal position when receiving the rejected linotypes. The pivoted receiving-tablet has a projecting stud $h^{64}$, with which coöperates a cam-groove $h^{65}$ in a guide-plate $h^{66}$, secured to the upper plate or rail of the mold's runway. Directly to the left of this plate is suitably supported a removable galley $h^{67}$, which stands in an inclined position with its open upper end in position to receive the linotype from the tablet $h^{59}$.

The rod $h^{61}$ is connected by a link $h^{68}$ with the free end of the lever $h^{69}$, which works against the face of a cam $h^{70}$, located at the extreme front of the auxiliary movement-shaft $c$. At the proper time the cam $h^{70}$ acts to raise the rod $h^{61}$ against a retracting-spring $h^{71}$, thereby causing the receiving-tablet $h^{59}$ to be rocked on its pivot by the pin $h^{64}$ and the cam-groove $h^{65}$, and by the combined movements thereby resulting the linotype or slug on the tablet will be thrown into the open end of the galley against a piece of printers' furniture $h^{72}$ and will be caught and held from return movement with the tablet by a spring-hook $h^{73}$. The position which the tablet assumes in delivering the linotypes into the galley is shown in Fig. 38. The free end of the retaining-hook $h^{73}$ lies in the path of the linotype when the tablet approaches the galley and is thereby cammed down against its retracting-spring to permit the passage of the linotype, and the tablet $h^{59}$ is cut away to prevent the hook being struck by the head on its return movement. Several of the ejected linotypes $z$ are shown in the galley in Fig. 38.

*General operation of the machine.*—The operation of the machine as an entirety was stated in a summary way in the introductory general description under the heading "Preliminary view of the general operation."

The operation of the different groups of mechanism has also been separately stated in connection with the detailed description. The operation of the primary setting devices, for example, has been stated in detail, the operation of the drive mechanism and the constantly-running parts of the matrix-making mechanism, with special reference to the timing or sequence of the same in relation to the dummy proper, has been given; the operation of the justifier has been stated; the operation of the filling device, and the operation of the casting mechanism and the matrix-carrying drum from the auxiliary movement-shaft have just been fully stated in the description of the casting mechanism.

A review of the operation of the machine taken as an entirety may be stated as follows: The operator manipulates the keyboard exactly as on an ordinary type-writer, thereby indicating the characters and normal word-spaces for the selected line. This operation of the keyboard, through the parts controlled therefrom, results in positioning or setting the duplicate dummy. As many sets of the duplicate-dummy's pieces $d^{53}$ will thus be positioned or arranged relative to each other on their supporting-frame $d^{52}$ as there were characters and word-spaces indicated at the keyboard for the entire line. The action from the keyboard also moves upward the indicator-rack $d^{77}$, so that its pointer indicates on the scale $d^{80}$ the amount of letter-space required for the selected characters and normal word-spaces and results in leaving the said indicator-rack $d^{77}$ in the proper position for the same to act by its stud $g^8$ on the idle-rack $g^7$ when the dummy-frame is raised and, through the connections therefrom, to properly locate the bearing-block $g^{20}$ with respect to the pivotal center of the tilting frame $g^{17}$, thereby fixing the quantity of variation for justification, if any be required.

The action of the keyboard through its space bar or key $d^{83}$ and the connections therefrom also locates the word-space rack $g^{24}$ in its proper relative position, so that when the dummy-frame is raised the said word-space rack will properly locate the escapement-pawls $g^{33}$ for coöperation with the proper member of the variable-escapement racks $g^{34}$ to distribute or divide the variation among all the word-spaces of the line under the control of the dummy proper. When the operator at the keyboard sees from the indicator-scale that he must break the line or stop the further selection of characters, he touches the starting-key $c^5$, thereby through the connections from the same throwing into action the auxiliary movement-shaft $c$ and starting the automatic movements controlled therefrom. During the first sixty-degrees movement of this shaft $c$ the duplicate-dummy frame is raised upward to its limit and again immediately lowered by the cams $d^{55}$ and $d^{56}$ and the connections therefrom. The upward movement of the duplicate dummy transfers the settings from the slides or pieces $d^{53}$ of the duplicate dummy to the stops $f'$ of the dummy proper, thereby correspondingly setting or positioning the sets of stops $f'$ on the dummy proper for the entire selected line. The upward movement of the duplicate dummy through the indicator-rack $d^{77}$ and its connections and the word-space rack $g^{24}$ and its connections set the bearing-block $g^{20}$ and the escapement-pawls $g^{33}$, as just previously described, for controlling the supplemental feed of the matrix-material holder. The vertical movements of the duplicate dummy, either the upward or downward, taken together, released all the parts of the primary setting devices which had in any way been set or changed by the action of the keyboard, permitting all of the same to return into their normal positions or causing them to return thereto, so that they are ready for use by the operation of the keyboard for the next line. This upward and downward movement of the duplicate-dummy's frame requires about one second of time. The operator then goes forward at the keyboard, selecting the characters for the next line. While he is so doing, the matrix-making mechanism will be at work under the control of the dummy proper, producing a matrix of the previous line, and the casting mechanism will be at work producing a cast, either in the form of a slug or linotype, from the matrix-holder then in front of the mold, which cast would correspond to the second preceding line and be a linotype therefrom if the machine had been in continuous use for three lines or more.

The relative actions of the matrix-making mechanism and the casting mechanism are as follows: During the same first sixty degrees of the auxiliary shaft $c$, in which time the duplicate dummy was given its vertical movements, as just previously noted, the mold $h$ was also thrown to the rear of its runway into its casting position by the cam $h^{16}$ through roller $h^{14}$, cam-lever $h^{13}$, and the rack $h^{11}$, and the matrix-carrying drum $f^{100}$ was given a quarter-turn from the same source through the rack $h^{11}$ and the rack $h^{18}$ and pinion $h^{21}$, thereby throwing the four matrix-holders on the drum into their proper respective positions, the holder having the matrix of the last preceding line, if any was made, being thereby brought opposite to the mold. At the very end of this first sixty-degrees movement of the auxiliary shaft $c$ or at the very beginning of the second sixty degrees the cam $f^{18}$, acting through lever $f^{17}$, rod $f^{16}$, arm $f^{15}$, the trip-shaft $f^{12}$, and the shipper-fork $f^{11}$, throws the half-clutch $f^{10}$ into engagement with the half-clutch $f^9$, carried by the pin-wheel $f^5$, thereby locking the same to the pinion-driving shaft $f^6$ and causing the cam-flange $f^4$ on the power-shaft $b$ to become active to start the dummy on its travel and feed the same forward toward the left. The connections for this purpose and their action have been all set out in detail. On the initial movement of the dummy proper the stop-surface $f^{82}$, projecting from its frame, is thrown out from under the right arm $f^{81}$ of the cam-yoke lever $f^{80}$, thereby permitting the spacing-lever $f^{85}$ $f^{86}$ and the spacing-hook $f^{87}$ to become active, and also throwing the stop-surfaces $f^{114}$ under the controlling-arms $f^{76}$ $f^{78}$. The rocking forward of the trip-shaft $f^{12}$ on the clutch-closing action threw the trip-arm $f^{92}$ forward away from the pawls $f^{90}$ and $f^{93}$, permitting the same to be thrown forward by the spring $f^{89}$ into their active position on the matrix-material holder feed ratchet-wheel $f^{91}$. Hence on the next step of the dummy proper an initial feed will be given to the matrix-material holder while the selecting-finger remains idle, thereby throwing the matrix-material holder, which is then at the impression-point, into the bell-mouthed alining-channel $f^{103}$ and bringing all the matrix-holders into their exact positions. This same step of the dummy will throw the stop-surfaces $f^{114}$ out from under the controlling-arms $f^{78}$ and $f^{76}$. Thereafter all the parts of the finger-placing mechanism and the spacing mechanism will be active and will be variably intercepted by the sets of stops $f'$ of the said dummy to properly locate the selecting-finger for the alinement of the proper die and to give the proper throw to the feed-pawl of the matrix-material holder. Under the feed movements of the dummy one set after another of its stops will be brought into action in this way to control the finger-placing mechanism and the spacing mechanism until all of its sets of stops which had been arranged for the given line have been brought into use. Whenever this occurs, the shoe $f^{24}$ will be thrown backward over the first unset stops, causing the trip-pawl $f^{21}$ to engage with the ratchet $f^{26}$ on the front plate of the dummy-frame, and through the connections therefrom, as described in detail, will render the matrix-making mechanism inoperative to produce any further impression, first, by throwing the stop-surface $f^{112}$ on the pawl $f^{21}$ under the left arm of the yoke-shaped cam-lever $f^{80}$, thereby holding up the controlling members of the finger-placing and the spacing mechanism, and, secondly, by tripping out the lock-latch $f^{12}$ away from the stop-lug $f^{20}$ on the shipper-fork $f^{11}$, thereby allowing the fork's retracting-spring $f^{14}$ to become active to throw the sliding clutch into its normal idle position, and also to rock the trip-shaft $f^{12}$ backward, throwing the pawls $f^{90}$ and $f^{93}$ away from the matrix-material feed ratchet-wheel $f^{91}$. On the opening of the clutch the dummy was of course released by the release of the pin-wheel $f^{5}$, thereby permitting the dummy to be returned into its normal position by its cord and weight. As the selecting-finger $f^{55}$ was successively located by the placing mechanism, under the control of the dummy, for action on the proper die-operating rods $g^{41}$, the striker-plate $f^{44}$ was raised and again lowered at the proper times by the profile cam $f^{51}$ on the power-shaft $b$, thereby throwing the dies in succession to the common point of impression and after impression returning them to their normal position through the return-ring $f^{71}$. When at the point of impression, the dies are impressed by the impression-plunger $f^{37}$, which is operated at the proper times through the toggle-lever $f^{105}$ and its connections by the impression-cam $f^{109}$ on the power-shaft $b$. The relative timing of these different cams on the power-shaft $b$, which coöperate in the operation of the matrix-making mechanism, has been stated in detail and its repetition here is deemed unnecessary. It should be noted that whenever the selecting-finger $f^{55}$ was located by sets of the dummy-stops which had been positioned for word-spaces it was thrown to the center hole of the terminal or guide plate $f^{42}$ and acted on the releasing-pin $g^{56}$, and through the connections therefrom operated the escapement-pawls $g^{33}$ of the justifier-controller, permitting the justifier-escapement to move one step and, through the other parts of the controller, varying the normal feed, if necessary, of the matrix-material holder, so as to effect the justification of the line.

The relative speeds of the power-shaft $b$ and the auxiliary shaft $c$ are such that the dummy proper would necessarily be fed through toward the left its full length or to its limit, and be released and returned to its normal position during the last three-hundred-degrees movement of the said auxiliary shaft. This relation is simply to insure the return of the dummy to its normal position by the time that the casting mechanism has completed its work on the matrix of the previous line. Otherwise there is no reason why the matrix-making mechanism might not continue to work after the auxiliary movement-shaft had completed its revolution, inasmuch as all the cams which coöperate with the dummy to control the production of the impressions are on the constantly-running power-shaft $b$. Ordinarily the whole series of the dummy-stops $f'$ will not be called into action for any given line, and the dummy will have completed its work and have been returned to its normal position before the auxiliary shaft $c$ completes its revolution.

The rocking of the trip-shaft $f^{12}$ at the final outward movement of the dummy threw the trip-arm $f^{92}$ backward, forcing the pawls $f^{90}$ and $f^{93}$ away from the ratchet-wheel $f^{91}$, as before stated, which thereby released the matrix-material holder, permitting the same to be returned to its normal position by its cord and weight, so that it will stand wholly within its seat on the matrix-carrying drum $f^{100}$. The return of the dummy proper effected all the other necessary releases, as has been stated in detail, thereby returning or permitting to be returned to their normal positions all the parts of the justifier mechanism. At the extreme of the dummy's return movement the lock-plate $f^{27}$ strikes with its right end against the left face of the trip-plunger $f^{30}$, thereby throwing the said plate into its idle position against the strain of the spring $f^{29}$ and holding the same there. This permits all the stops $f'$ of the dummy proper to drop on their supporting-frame $f'$ into their lowermost or normal position. The dummy proper and all the parts of the matrix-making mechanism are now in their normal position ready for use for the next line, when the starting-key is again touched.

Returning now to the casting mechanism, it will be recalled that we left the auxiliary shaft $c$ at the end of its first sixty-degrees movement. During the next or second sixty degrees of the said shaft's movement the casting-pot is thrown toward the right, with its nozzle against the back of the mold, and is there held by the cam $h^{42}$, through the roller $h^{40}$ and lever $h^{39}$, during the next one-hundred-and-twenty degrees movement of the said shaft. The pressure of the nozzle of the casting-pot against the back of the mold forces the mold tightly against the matrix-material holder. At the end of the second sixty-degrees movement of the shaft $c$ the cam $h^{49}$ permits the lever $h^{47}$ to become subject to its weight $h^{48}$, thereby depressing the pump-plunger $h^{44}$ by an instantaneous action and producing the cast, and immediately thereafter the said cam again lifts the lever $h^{47}$ and its weight $h^{48}$ and throws the pump-plunger into its idle or normal position. During the fourth sixty-degrees movement of the shaft $c$ the casting-pot is thrown backward away from the mold and into its normal position by the above-named cam $h^{42}$, acting on the lever $h^{39}$ through the other roller $h^{41}$. During the fifth sixty-degrees movement of the shaft $c$ the mold $h$ is thrown to the front of its runway into its normal or ejecting position by the cam $h^{17}$ through roller $h^{15}$, lever $h^{13}$, and rack $h^{11}$. In this movement of the rack $h^{11}$ the rack $h^{18}$ moves therewith, but the spring-pawl $h^{22}$ on the shaft $h^{21}$ slips over the ratchet-teeth of the pinion $h^{23}$, so that the drum $f^{100}$ remains stationary.

During the last sixty-degrees movement of the shaft $c$ the cast linotype or slug is ejected from the mold $h$ by the cam $h^{57}$, acting through the cam-lever $h^{56}$, link $h^{55}$, lever $h^{54}$, rack $h^{53}$, and ejecting-blade $h^{52}$. The ejected linotype or slug is received on the tablet $h^{59}$ and there remains until the starting-key is again touched to throw the auxiliary movement-shaft into action for the next line. The cam $h^{70}$, through the cam-lever $h^{69}$ and its connections, will raise the tablet and throw the linotype or slug into the galley $h^{67}$ and against the tension of a retracting-spring $h^{71}$, by which, when permitted by the said cam, the said tablet and its supporting parts will be returned to their normal position. This movement of the tablet to deliver into the galley and return to normal position may have taken place during the whole or any part of the first three-hundred-degrees movement of the auxiliary movement-shaft $c$, delivering, as before stated, the linotype or slug of the previous line. During the last three-hundred-degrees movement of the auxiliary shaft $c$ the filling device may have been in operation, through the eccentric $f^{133}$, rod $f^{131}$, shaft $f^{129}$, and the connections therefrom, to fill the empty matrix-material holder then in line therewith with a new strip of matrix material, as has been set forth in detail. When the auxiliary movement-shaft $c$ has completed its revolution, it will automatically throw itself out of gear with the power-shaft $b$ through the coöperation of the trip-block $c^{3}$ and the tail end of the pawl $c^{2}$, as has been set forth in detail.

The work of the casting mechanism in producing a cast of, say, line No. 1 and of the matrix mechanism in producing a matrix of line No. 2 under the control of the dummy proper were concurrent, as is obvious from the previous description, and are ordinarily completed at about the same instant of time. Meantime, as has already several times been stated, the operator is at work (after the first sixty-degrees movement of the auxiliary shaft $c$) on the keyboard selecting the characters and normal spaces and, through the connection from the same, positioning the parts of the duplicate dummy, the indicate-rack, and the word-space rack for line No. 3, and should be ready or about ready to again touch the starting-key.

All the material parts or pieces of the entire machine have now been specified and their operation traced. One or two additional facts, however, should be noted.

Such of the particular pieces of the duplicate dummy which are used for the spacing are cut two units short at their lower ends, so that when operated upon by the corresponding setting-slide and the setting-carriage for normal spaces of two units they will not be raised on their supporting-frame. Hence when the duplicate dummy is lifted to transfer its settings to the dummy proper the corresponding stops of the dummy proper will not be raised, but will be left in their lowermost position. In other words, the spacing-stops on the dummy proper, which are used for the normal spacing of two units, will remain in their lowermost position, so as to intercept the spacing-hook at its shortest throw.

The reason for pivoting the spring-held fingers of the setting-carriage is to permit them to tilt on the feed movements of the setting-carriage, if necessary, so as to pass any of the stops or parts of the duplicate dummy which might otherwise interfere with the movement of the said carriage. This would not likely occur, but might occur under some conditions. The reason for this possibility is the fact that the particular pieces or stops of both the duplicate dummy and the dummy proper, which constitute the factors which work together in sets of three for the selection and the spacing of the dies, are not arranged in succession, but are arranged in advance of each other, with the factors of other sets between them. For example, the factors of the first set would be the first, the fifth, and the ninth piece on each of the dummies. This arrangement of the factors in advance of each other is simply to permit the controlling-arms of the placing and the spacing levers to be spread apart, so as to give to the same more room, enabling them to be made larger and stronger and to work with less liability to interference.

It will of course be understood that many of the principal features shown and described as embodied in this machine are, as stated in the introductory description, capable of other and additional uses. The dummy is equally capable of controlling the release of female matrices, from which, when assembled, a linotype might be cast, or of releasing the type in a type-setting machine. It is of course obvious that the dummy, in combination with the selecting-finger and the die-operating rods, might be used to operate type-writers, printing by direct impression. The same mechanism might also be used generally wherever it is desired to select a variable number of desired things from a multitude or large series of things. For example, this mechanism might be used to select musical notes in some forms of musical instruments.

What I claim, and desire to secure by Letters Patent, is as follows:

1. The combination with a font of dies, of a corresponding series of independently-movable die-levers, carrying the said dies, by the movements of which the dies are alinable at the point of impression, and a dummy or mechanical line, consisting of a series of independently-movable parts prearrangeable for an entire selected line, for automatically controlling the selection and the operation of the said die-levers and dies, substantially as described.

2. The combination with a font of dies, of a corresponding series of independently-movable die-levers, carrying the said dies, by the movements of which levers the dies are alinable at the point of impression, a movable selecting-finger, for selecting and operating said die-carrying levers and a dummy or mechanical line, the parts of which are prearrangeable for the entire line, for controlling the said selecting-finger, substantially as described.

3. The combination with a font of independently-movable dies, of factored connections for selecting and alining the said dies, a dummy, the parts of which are prearrangeable in corresponding sets or factors for an entire line, and a selecting device operative on any one of said connections, under the control of said dummy, to effect the selection of the dies.

4. The combination with a font of independently-movable dies, of a corresponding series of die-operating rods or connections having grouped terminals, at one end, and an automatic selecting-finger mounted for alinement with and action on any desired one of said terminals.

5. The combination with a font of dies individually movable for alinement in succession at the impression-point, of selecting connections having their terminals factored or arranged in groups, a correspondingly-factored dummy, the parts of which are prearrangeable in sets or factors for the entire desired line and an intermediate selecting device for operation on the terminals of said connections, under the control of the dummy, one factor, in each set of the said dummy's parts, serving to locate the selecting device with reference to the group of terminals and the other with reference to the particular terminal of the group, substantially as described.

6. The combination, for automatically selecting desired things from a multitude or series of things, as desired dies from a font of dies, of a series of operating connections having their terminals, at one end, factored or arranged in groups, a correspondingly-factored dummy containing pieces, prearrangeable in sets of factors, for the entire series of selections, and a selecting device controllable by said dummy for action on any one of said terminals.

7. The combination with a font of individually-movable dies, of the dummy with prearranged stops as described, the selecting-finger capable of location to select the die, and locating or placing devices controlled by the dummy for locating the finger.

8. The combination with a font of individually-movable dies, of a corresponding series of operating-rods (connections) having terminals grouped into rows in two directions, a selecting-finger movable in two directions, for action on any one of said terminals, the dummy with prearranged stops, two for each die, and a corresponding pair of finger-placers controlled by said dummy for locating the finger for action on the proper terminal to select the die.

9. The combination with a series or set of movable individual die-carriers, of a corresponding series of operating-rods (connections) having their terminals grouped into two factors or rows in two directions, a movable striker-plate facing said terminals, a selecting-finger capable of universal movement over said plate, for action on any of said terminals, the dummy with prearranged stops and the placing mechanism controlled by the dummy for locating the finger, substantially as described.

10. The combination with a series of movable individual dies alinable in succession at a common point of impression, of a corresponding series of operating-rods (connections) having terminals grouped into two factors or rows in two directions, a selecting-finger capable of universal movement for action on any one of said terminals, an impression-material-feeding device, and the dummy or mechanical line, the parts of which work in sets of three pieces or factors, two of which factors control the movement of said finger to select the die and the third of which factors controls the said feeding device to space the impressions.

11. The combination with a font of independently-movable individual die-carriers, alinable in succession at the impression-point, of an impression-material holder, a dummy with prearranged die-selecting and die-spacing stops and a feeding device controlled by said spacing-stops, substantially as described.

12. The combination with the independently-movable die-carriers and the operating-rods for alining the same, of the constantly-reciprocating striker-plate, the selecting-finger movable over said plate, the finger-placing levers and the spacing-lever under tension, the constantly-reciprocating impression-plunger, the dummy with prearranged stops for controlling said placing and spacing levers, the constantly-running shaft for operating all the said parts in the proper sequence, substantially as described.

13. The combination with the striker-plate of the selecting-finger over said plate and a pair of locating-slides movable in different directions and provided each with an elongated slot parallel with the other's line of movement, the slotted parts of both slides embracing the said finger, substantially as and for the purpose set forth.

14. The combination with the striker-plate of the selecting-finger with expanded base resting on said plate and the pivoted idler overlying the base of the said finger and having an elongated slot through which works the stem of said finger, for holding the said finger on said plate with freedom for universal motion therein, substantially as described.

15. The combination with the striker-plate of the slotted pivoted idler working over the face of the same, the selecting-finger having its base on said plate under said idler and its stem projecting through the slot of the same, the rod-box with terminals of the rods facing said striker-plate and the locating-slides movable in different directions and each provided with an elongated slot parallel with the line of the other's movement and both embracing said finger, substantially as described.

16. The combination with the striker-plate of the slotted pivoted idler, the selecting-finger with its base underlying said idler and its stem working through the slot of the same, the locating-slides with slots, the slotted parts of the respective slides being at right angles to each other and embracing the said finger, the springs connected to said slides, the placing-levers with connections to said slides, the constantly-running cam for action on said levers in opposition to said springs and the dummy with prearranged stops for controlling the levers, substantially as described.

17. The combination with a dummy with parts prearrangable in sets or factors, for the entire desired line, of a setting-carriage having a single set of independently-movable corresponding factors, a corresponding set of movable bail-blades forming runways for the factors of the carriage, a series of setting-slides, corresponding in number to the total of the characters represented on the keyboard, and each having striking-surfaces corresponding to the factors of the carriage for action on the bail-blades, and operative connections controlled from the keys for moving said slides and for effecting the feed of the carriage.

18. The combination with a dummy having parts prearrangeable in factors, for the entire line, of the setting-carriage having a single set of independently-movable corresponding factors, the corresponding set of bail-blades forming runways for the factors of the carriage, the series of setting-slides equal to all characters represented on the keyboard, each having striking-surfaces for action on the said bails, the setting-shaft under constant strain, the escapement-trip for starting and stopping said shaft, the movable bar connected to cranks or eccentrics on said shaft, the key-rods in line with said setting-slides and adapted to be thrown into engagement with said bar for action on the slides, and the key-levers for operating said rods and the escapement-trip, substantially as described.

19. The combination with the matrix-material holder of the normal feed-rack for the same, the supplemental feed-rack for said holder under strain or tension to move backward, the guide block or rail movable transversely to the travel of the feed-racks, the loose rack mounted on the normal feed-rack with freedom for movement transversely to the travel of the feed-rack and provided with a stop-lug riding on said guide-block, and an idle-shaft carried by the normal feed-rack having a gear in mesh with said loose rack and a pinion engaging said supplemental feed-rack, whereby movement of said block will impart an independent movement to said supplemental feed-rack, substantially as described.

20. The combination with the matrix-material holder, of the normal feed-rack, the supplemental feed-rack under strain to move backward, the loose rack, idle-shaft, gear and pinion all carried by the normal feed-rack and forming the connection between the two racks, as described, the guide block or rail supporting said loose rack against the strain on the supplemental rack, the justifier feed-bar supporting said guide-block and a controller for said justifier feed-bar, the parts of which are adapted to be set for action, if necessary, at the word-space movements of the matrix-material holder, for varying the normal feed, if necessary, between words so as to justify the line.

21. The combination with the matrix-material holder, of the connections for effecting a supplemental feed to the same, the justifier feed-bar for effecting said feed, the tilting frame provided with the bearing-block for action on said justifier feed-bar, shiftable with reference to the pivotal center of the said frame, to determine the quantity of movement to be imparted to said feed-bar, means for setting said bearing-block from the letter-spacing devices controlled from the keyboard, means for throwing said frame under strain to rock to its limit, a multiple-rack escapement, with a series of racks varying in number of teeth to correspond with the range of word-spaces in lines, for upholding said frame, escapement-pawls adapted to be set for action on any one of the said series of racks, means for setting the said pawls by the word-spacing devices on the keyboard, the dummy for controlling the matrix-making mechanism and releasing devices for the said escapement-pawls operated at the word-space movements of the matrix-material holder, under the control of the said dummy, substantially as and for the purpose set forth.

22. The combination of the die-levers in circular arrangement, of the striker-plate and the return-ring overlying all the said levers and movable with the said striker-plate, for insuring the return of the said die-levers to their normal positions after use.

23. The combination with the matrix-material holders, of the drum carrying the said holders, and the rigid guide-channel in line with the matrix-material holders when at the impression-point and forming a continuation of the holders-seat or guideway, under its feed movements, to space the impressions, substantially as described.

24. The combination of the anvil, the drum movable on the said anvil, the anvil-bracket provided with a bell-mouthed alining-channel, the matrix-material holders mounted on said drum and movable crosswise of the same to effect the feed of the matrix, and means for imparting to the said holders an initial movement, when at the impression-point, before any impression is made, into the said bell-mouthed alining-channel, for the purpose of accurately alining the holder at the impression-point and the other holders of the drum, in their respective required positions.

25. The combination with the galley and the mold, of the ejecting-blade, the pivoted receiving-tablet mounted on a movable head for receiving the ejected linotype, the plate with camways and the lug on the tablet working in the said camways under the movement of the said head to rock the said tablet and deliver the linotype to the galley, substantially as and for the purpose set forth.

26. The combination with a matrix-making mechanism, of a dummy or mechanical line, for controlling the same, a constantly-running shaft, intermediate devices kept in constant motion from said shaft, for operating the matrix-making mechanism, and means for rendering the said constantly-running intermediate devices inoperative, to produce a matrix at all times, except when the said dummy is in action.

27. The combination with a matrix-making mechanism, of a dummy with prearranged parts, for controlling the same, a constantly-running shaft, intermediate devices kept in constant motion from said shaft, for operating the matrix-making mechanism, means for rendering said constantly-running intermediate devices inoperative, to produce a matrix at all times, except when the dummy is in action, means for automatically throwing the dummy into action, and means for automatically throwing the said dummy out of action, after all its parts, which have been set for use in the given line, have done their work, substantially as and for the purposes set forth.

28. In a matrix-making machine, the combination with the independently-movable individual die-carriers, of the operating-rods for said carriers, having their terminals grouped on a bifactored principle, a selecting-finger, for action on the said rods, kept in constant motion through the plane of the rod-terminals, finger-placing mechanism under constant strain to locate the finger, a constantly-reciprocating die-impressing device, a dummy with prearranged parts, for controlling said finger-placing mechanism and the selection and spacing of the dies, a constantly-running shaft, for operating all the said constantly-running parts in the proper sequence, and means for rendering the said constantly-running parts inoperative, to produce a matrix at all times, except when the dummy is in action, substantially as described.

29. A justifying mechanism, for a matrix-making, type-writing or similar machine, comprising normal and supplemental feed devices for the impression material, and a controller for said supplemental feed device, consisting essentially of a pivoted lever, the throw of the power end of which is uniform for all lines, and the throw of which at the point of its application to its weight or work is variable for any given line, whereby the throw of the lever at the point of application of the weight determines the amount or quantity of the variation in the normal feed.

30. A justifying mechanism for a matrix-making, type-writing or similar machine, comprising normal and supplemental feed devices for the impression material, and a controller for said supplemental feed device, consisting essentially of a pivoted lever, the throw of which, at its power end, is constant or uniform for all lines, and the throw of which at the point of its application to its weight or work is variable in extent and direction, for any given line, whereby the variation in the normal feed of the said impression material, may be made by way of either addition or subtraction and to any extent required for justification.

31. A justifying mechanism for a matrix-making, type-writing, or similar machine, comprising normal and supplemental feed devices for the impression material, and a controller for the said supplemental feed device, consisting of a pivoted lever, the throw of which at its power end is constant for all lines, and the throw of which at the point of its application to its weight or work is variable for any given line, and a variable escapement for dividing the throw of the power end of said lever into any number of movements desired, whereby the variation of the feed, for the purposes of justification, may be made among any desired feed movements of the matrix material, such as among the word-spaces, substantially as described.

32. A justifying mechanism for a matrix-making, type-writing or similar machine, comprising normal and supplemental feed devices for the impression material, a controller for said supplemental feed device, consisting of a pivoted lever, the throw of which at its power end is uniform for all lines, and the throw of which, at the point of application to its weight or work, is variable in extent and in direction, and a variable escapement for subdividing the throw of the said lever at its power end into any number of steps desired, and means for releasing said escapement at the word-space movements of said impression-material-feed device, substantially as described.

33. The combination with normal and supplemental feed devices for the impression material, of a controller for the supplemental feed device, consisting of a pivoted lever, the throw of which at its power end is constant for all lines, and the throw of which at the point of application to its weight or work is variable for any given line, a variable escapement for subdividing the throw of said lever, at its power end into any desired number of steps, a bank of keys, connections from the letter-space members of said keys, for fixing the throw of said lever at its weight end, for any given line, and connections from the word-space members of said keyboard, for setting said variable escapement to subdivide the throw of said pivoted lever at its power end for any given line into as many steps as there are word-spaces in the said line, substantially as described.

34. The combination with normal and supplemental feed devices for the impression material, of a controller for said supplemental feed device, consisting of a pivoted lever or tilting frame, the throw of which at the power end is uniform for all lines, and the throw of which, on its weight, is variable in extent and direction, a bearing-block or connection to the said supplemental feed, which is shiftable toward and from and to opposite sides of the pivotal center of said lever or frame, for varying the throw of the lever at the point of its application to its weight in extent and direction, a bank of keys, letter-space connections from the same, for setting said bearing-block, with reference to said pivotal center for any given line, a multiple-rack escapement, for subdividing the throw of said pivoted lever or tilting frame at its power end, word-space connections from said bank of keys, for setting said multiple-rack escapement, and automatic devices for releasing said escapement at the feed movements of the impression material between words, substantially as described.

35. The combination with the matrix-material holder, of the normal feed-rack for the same, the supplemental feed-rack for said holder, under strain to move backward, the guide block or rail $g^2$, adapted to be set parallel with or at any angle to the said supplemental feed-rack, the loose rack carried by the normal feed-rack and movable transversely to the travel of the same, and provided with a stop-lug riding on said guide-block, an idle-shaft on said normal feed-rack, having a gear in mesh with said loose rack, and a pinion engaging with said supplemental feed-rack, substantially as described, whereby the units of feed on the matrix-material holder may be changed, at will, by adjusting the guide-block $g^2$, for adapting the feed to any unit upon which the type-faces may be cut.

In testimony whereof I affix my signature in presence of two witnesses.

FRANK AMOS JOHNSON.

Witnesses:
JAS. F. WILLIAMSON,
EMMA F. ELMORE.